US012380060B2

(12) United States Patent
Du et al.

(10) Patent No.: US 12,380,060 B2
(45) Date of Patent: Aug. 5, 2025

(54) GRAPH SPATIAL SPLIT

(71) Applicant: SambaNova Systems, Inc., Palo Alto, CA (US)

(72) Inventors: Yun Du, Palo Alto, CA (US); Gao Deng, Palo Alto, CA (US); Jianding Luo, Palo Alto, CA (US); Zhengyu Chen, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 58 days.

(21) Appl. No.: 18/202,059

(22) Filed: May 25, 2023

(65) Prior Publication Data
US 2024/0168915 A1 May 23, 2024

Related U.S. Application Data

(60) Provisional application No. 63/348,961, filed on Jun. 3, 2022, provisional application No. 63/346,234, filed on May 26, 2022, provisional application No. 63/345,740, filed on May 25, 2022.

(51) Int. Cl.
G06F 15/82 (2006.01)
G06F 9/38 (2018.01)

(52) U.S. Cl.
CPC .......... G06F 15/825 (2013.01); G06F 9/3867 (2013.01)

(58) Field of Classification Search
CPC .................................................. G06F 15/803
See application file for complete search history.

(56) References Cited

U.S. PATENT DOCUMENTS 10,768,899 B2  9/2020  Koeplinger et al.
11,204,889 B1  12/2021 Prabhakar et al.
11,237,971 B1  2/2022  Brown et al.
11,250,105 B2  2/2022  Wang et al.
(Continued)

FOREIGN PATENT DOCUMENTS

WO   2010142987 A1   12/2010

OTHER PUBLICATIONS

Jingzhi Fang, Yanyan Shen, Yue Wang, and Lei Chen. 2020. Optimizing DNN computation graph using graph substitutions. In VLDB, 13, 12 (2020). (Year: 2020).*
(Continued)

Primary Examiner — Michael J Metzger
(74) Attorney, Agent, or Firm — Flagship Patents; Sikander M. Khan; Bruce A. Young

(57) ABSTRACT

A method for reducing latency and increasing throughput in a reconfigurable computing system includes receiving a compute graph for execution on a reconfigurable dataflow processor comprising a grid of compute units and grid of memory units interconnected with a switching array. The compute graph includes a node specifying an operation on a tensor. The node may be split into multiple nodes that each specify the operation on a distinctive portion of the tensor to produce a first modified compute graph. The first modified compute graph may be executed. In addition, the multiple nodes may be within a single meta-pipeline stage and may be processed in parallel. Furthermore, the compute graph may further comprise a separate node for gathering the distinctive portions of the tensor into a complete tensor, to produce a second modified compute graph.

17 Claims, 19 Drawing Sheets

(56) References Cited

U.S. PATENT DOCUMENTS

| | | | |
|---|---|---|---|
| 11,429,349 | B1 | 8/2022 | Oklobdzija et al. |
| 11,443,014 | B1 | 9/2022 | Wang et al. |
| 2021/0157550 | A1 | 5/2021 | Wang et al. |
| 2021/0248115 | A1* | 8/2021 | Jones ............... G06F 9/5038 |
| 2021/0373867 | A1 | 12/2021 | Chen et al. |
| 2022/0092247 | A1 | 3/2022 | Koeplinger et al. |
| 2022/0124543 | A1* | 4/2022 | Orhan ............... G06N 3/006 |
| 2022/0129320 | A1 | 4/2022 | Mohapatra et al. |
| 2022/0413928 | A1* | 12/2022 | Banuli Nanje Gowda ............... H04W 28/16 |
| 2023/0273879 | A1 | 8/2023 | Bordelon et al. |

OTHER PUBLICATIONS

Koeplinger et al., Spatial: A Language and Compiler for Application Accelerators, PLDI '18, Jun. 18-22, 2018, Association for Computng Machinery, 16 pages.

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

Zhang et al., "SARA: Scaling a Reconfigurable Dataflow Accelerator," 2021 ACM/IEEE 48th Annual International Symposium on Computer Architecture (ISCA), 2021, pp. 1041-1054.

\* cited by examiner

730 →

| Template Dataflow Statements | Tensor Size |
|---|---|
| %1 = tlir.Region(name: "In0"): | NxCxMxK bf16 |
| %2 = tlir.Region(name: "Weight"): | KxN bf16 |
| %3 = tlir.Region(name: "Bias"): | 1xN bf16 |
| %4 = tlir.Region(name: "Out0"): | NxCxMxN bf16 |
| %5 = tlir.Load(%2) | |
| %6 = tlir.Load(%3)  ←732 | |
| %7 = tlir.MetaPipeline(iters: N) { | |
|   %8 = tlir.Load(%1, dim: 1): | CxMxK bf16 |
|   %9 = tlir.Buffer(%5, depth: 2): ←732 | CxMxK bf16 |
|   %10 = tlir.MetaPipeline(iters: C) { | |
|     %11 = tlir.ReadSlice(%9, dim: 1): | MxK bf16 |
|     %12 = tlir.Linear(%5, %11): | MxN bf16 |
|     %13 = tlir.Buffer(%12, depth: 2): | MxN bf16 |
|     %14 = tlir.AddBias(%13, %6): | MxN bf16 |
|     %15 = air.ReLU(%14): | MxN bf16 |
|     %16 = air.Exp(%15): | MxN bf16 |
|     %17 = tlir.Buffer(%16, depth: 2): | MxN bf16 |
|     %18 = tlir.Sum(%17, dim: 1): | Mx1 bf16 |
|     %19 = tlir.Div(%17, %18): | MxN bf16 |
|     %20 = tlir.Store(%4, %19) | |
|   } | |
| } | |

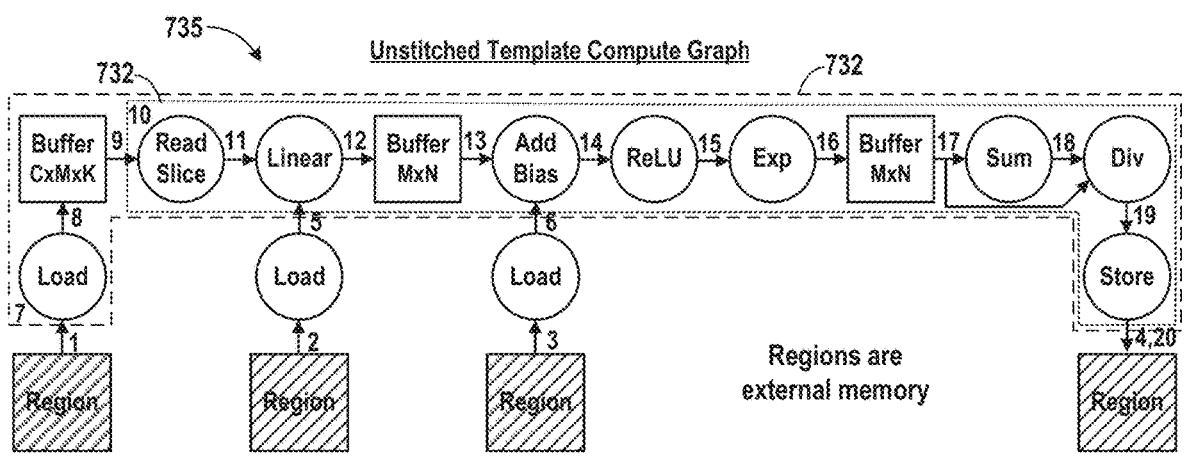

FIG. 7C

GRAPH SPATIAL SPLIT

RELATED APPLICATIONS AND DOCUMENTS

This application claims the benefit of (priority to) U.S. Provisional Application 63/346,234 filed on May 26, 2022, entitled "GPT3 Graph Spatial Split", U.S. Provisional Application 63/348,961 filed on Jun. 3, 2022, entitled "Tensor Parallel Mapping and Data-Parallel Split", and U.S. Provisional Application 63/345,740 filed on May 25, 2022, entitled "High Performance LayerNorm".

This application is related to the following papers and commonly owned applications:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- Zhang et al., "SARA: Scaling a Reconfigurable Dataflow Accelerator," 2021 ACM/IEEE 48th Annual International Symposium on Computer Architecture (ISCA), 2021, pp. 1041-1054;
- U.S. Nonprovisional patent application Ser. No. 16/260,548, filed Jan. 29, 2019, entitled "MATRIX NORMAL/TRANSPOSE READ AND A RECONFIGURABLE DATA PROCESSOR INCLUDING SAME,";
- U.S. Nonprovisional patent application Ser. No. 15/930,381, filed May 12, 2020, entitled "COMPUTATIONALLY EFFICIENT GENERAL MATRIX-MATRIX MULTIPLICATION (GEMM),";
- U.S. Nonprovisional patent application Ser. No. 16/890,841, filed Jun. 2, 2020, entitled "ANTI-CONGESTION FLOW CONTROL FOR RECONFIGURABLE PROCESSORS,";
- U.S. Nonprovisional patent application Ser. No. 17/023,015, filed Sep. 16, 2020, entitled "COMPILE TIME LOGIC FOR DETECTING STREAMING COMPATIBLE AND BROADCAST COMPATIBLE DATA ACCESS PATTERNS,";
- U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION,";
- U.S. Nonprovisional patent application Ser. No. 17/216,647, filed Mar. 29, 2021, entitled "TENSOR PARTITIONING AND PARTITION ACCESS ORDER,";
- U.S. Provisional Patent Application No. 63/190,749, filed May 19, 2021, entitled "FLOATING POINT MULTIPLY-ADD, ACCUMULATE UNIT WITH CARRY-SAVE ACCUMULATOR,";
- U.S. Provisional Patent Application No. 63/174,460, filed Apr. 13, 2021, entitled "EXCEPTION PROCESSING IN CARRY-SAVE ACCUMULATION UNIT FOR MACHINE LEARNING,";
- U.S. Nonprovisional patent application Ser. No. 17/397,241, filed Aug. 9, 2021, entitled "FLOATING POINT MULTIPLY-ADD, ACCUMULATE UNIT WITH CARRY-SAVE ACCUMULATOR,";
- U.S. Nonprovisional patent application Ser. No. 17/520,290, filed Nov. 5, 2021, entitled "SPARSE MATRIX MULTIPLIER IN HARDWARE AND A RECONFIGURABLE DATA PROCESSOR INCLUDING SAME,";

All of the related application(s) and documents listed above are hereby incorporated by reference herein for all purposes.

BACKGROUND

The present subject matter relates to optimizing computing tasks for course-grained reconfigurable (CGR) processors.

Reconfigurable processors can be configured to implement a variety of functions more efficiently or faster than might be achieved using a general-purpose processor executing a computer program. For example, coarse-grain reconfigurable architectures (e.g. CGRAs) are being developed in which the configurable units in the array are more complex than used in typical, more fine-grained FPGAs, and may enable faster or more efficient (e.g., dataflow) execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Despite the promise of CGRAs, optimizing the compute graphs for the configurable units of a CRGA remains a challenge.

SUMMARY OF THE INVENTION

A method for reducing latency and increasing throughput in a reconfigurable computing system includes receiving a compute graph for execution on a reconfigurable dataflow processor that includes a grid of compute units and a grid of memory units connected with a switching array. The compute graph includes a node specifying an operation on a tensor. The tensor may be partitioned into blocks. The node is split into multiple nodes that each specify the operation on a distinct portion/block of the tensor to produce a first modified compute graph. A single meta-pipeline stage contains these multiple nodes. Moreover, these multiple nodes may be parallel to one another, so that distinct tensor blocks may be processed in parallel to reduce latency of that meta-pipeline stage. Specifically, the meta-pipeline stage's latency is reduced by a factor of X if the node is split into X nodes.

The method also includes adding a separate operation node, which receives tensor data from the multiple nodes. The separate operation node gathers the distinctive portions of the tensor to generate a complete tensor within the single meta-pipeline stage. Examples of the separate node include a node corresponding to a concatenation operation, a summation operation, an assembly operation, or any similar operation. Latency is reduced within the single metapipeline stage, but an extra latency cost is added to account for the concatenation operation. A corresponding system and computer program product are also disclosed herein.

BRIEF DESCRIPTION OF THE DRAWINGS

FIGS. 7A-7E illustrate various representations of an example user program corresponding to various stages of a compiler stack such as the compiler stack of FIG. 6.

DETAILED DESCRIPTION

Figure 1:
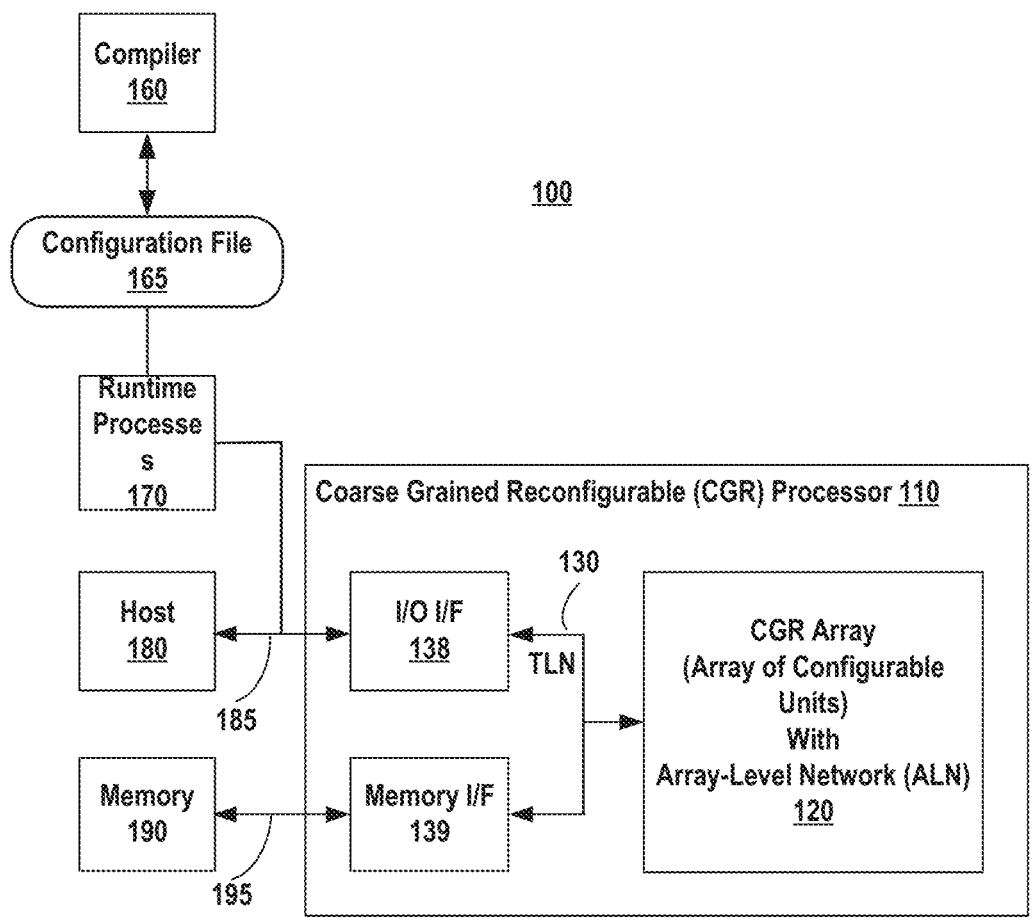
FIG. 1 illustrates an example system including a coarse-grained reconfigurable (CGR) processor, a host, and a memory.

The following detailed description is made with reference to the figures. Example implementations are described to illustrate the technology disclosed, not to limit its scope, which is defined by the claims. Those of ordinary skill in the art will recognize a variety of equivalent variations on the description that follows.

FIGS. 1-7E depict at least one example of an environment wherein the disclosed technology may be deployed while FIGS. 8-15 depict details on various examples of the disclosed technology.

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable (CGR) architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).

AI—artificial intelligence.

AIR—arithmetic or algebraic intermediate representation.

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Individual stages may create or update an intermediate representation (IR) of the translated statements. Compiler stages are illustrated with reference to FIG. 6.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Logical CGR array or logical CGR unit—a CGR array or a CGR unit that is physically realizable, but that may not have been assigned to a physical CGR array or to a physical CGR unit on an IC.

Meta-pipeline—see pipeline.

ML—machine learning.

PCU—pattern compute unit—a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level (typically a sequence of logical operations that are to be repetitively executed) that enables correct timing and loop control of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can store data according to a programmed pattern.

PNR—place and route—the assignment of logical CGR units and associated processing/operations to physical CGR units in an array, and the configuration of communication paths between the physical CGR units.

RAIL—reconfigurable dataflow processor (RDP) abstract intermediate language.

CGR Array—an array of CGR units, coupled with each other through an array-level network (ALN), and coupled with external elements via a top-level network (TLN). A CGR array can physically implement the nodes and edges of a dataflow graph.

SIMD—single-instruction multiple-data—an arithmetic logic unit (ALU) that simultaneously performs a single programmable operation on multiple data elements delivering multiple output results.

TLIR—template library intermediate representation.

TLN—top-level network.

Implementations

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. See, for example, FIGS. 6 and 7A-7E. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

FIG. 1 illustrates an example coarse-grained reconfigurable architecture (CGRA) system 100 including a coarse-grained reconfigurable (CGR) processor 110 a compiler 160, runtime processes 170, a host 180, and a memory 190. CGR processor 110 includes a CGR array such as a CGR array 120. CGR array 120 includes an array of configurable units in an array level network. CGR processor 110 further includes an IO interface 138, and a memory interface 139. CGR array 120 is coupled with IO interface 138 and memory interface 139 through a data bus 130 which may be part of a top-level network (TLN). Host 180 communicates with IO interface 138 using a system data bus 185, and memory interface 139 communicates with memory 190 using a memory bus 195. A configurable unit in the CGR array 120 may comprise a compute unit or a memory unit. A configurable unit in the CGR array 120 may also comprise a pattern memory unit (PMU), a pattern compute unit (PCU), or a fused-compute memory unit (FCMU). Further examples include a coalescing unit (CU) and an address generator (AG), which may be combined in an AGCU. A configurable unit may also be reconfigurable.

The configurable units in the CGR array 120 may be connected with an array-level network (ALN) to provide the circuitry for execution of a computation graph or a dataflow graph that may have been derived from a high-level program with user algorithms and functions. The high-level program may include a set of procedures, such as learning or inferencing in an artificial intelligence (AI) or machine learning (ML) system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple CGR processors 110. In some implementations, CGR processor 110 may include one or more ICs. In other implementations, a single IC may span multiple CGR processors 110. In further implementations, CGR processor 110 may include multiple arrays of configurable units 120.

Host 180 may be, or include, a computer such as further described with reference to FIG. 2. Host 180 runs runtime processes 170, as further referenced herein, and may also be used to run computer programs, such as compiler 160 further described herein with reference to FIG. 9. In some implementations, compiler 160 may run on a computer that is similar to the computer described with reference to FIG. 2 but separate from host 180.

CGR processor 110 may accomplish computational tasks by executing a configuration file 165. Configuration file 165 may comprise a processor-executable format file suitable for configuring a CGR array 120 of a CGR processor 110. For the purposes of this description, a configuration file corresponds to a dataflow graph, or a translation of a dataflow graph, and may further include initialization data. Compiler 160 compiles the high-level program to provide the configuration file 165. In some implementations described herein, a CGR array 120 is configured by programming one or more configuration stores with all or parts of the configuration file 165. A single configuration store may be at the level of the CGR processor 110 or the CGR array 120, or a configurable unit may include an individual configuration store. The configuration file 165 may include configuration data for the CGR array 120 and the configurable units in the CGR array 120, and link the computation graph to the CGR array 120. Execution of the configuration file 165 by CGR processor 110 causes the array(s) of configurable units 120 (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
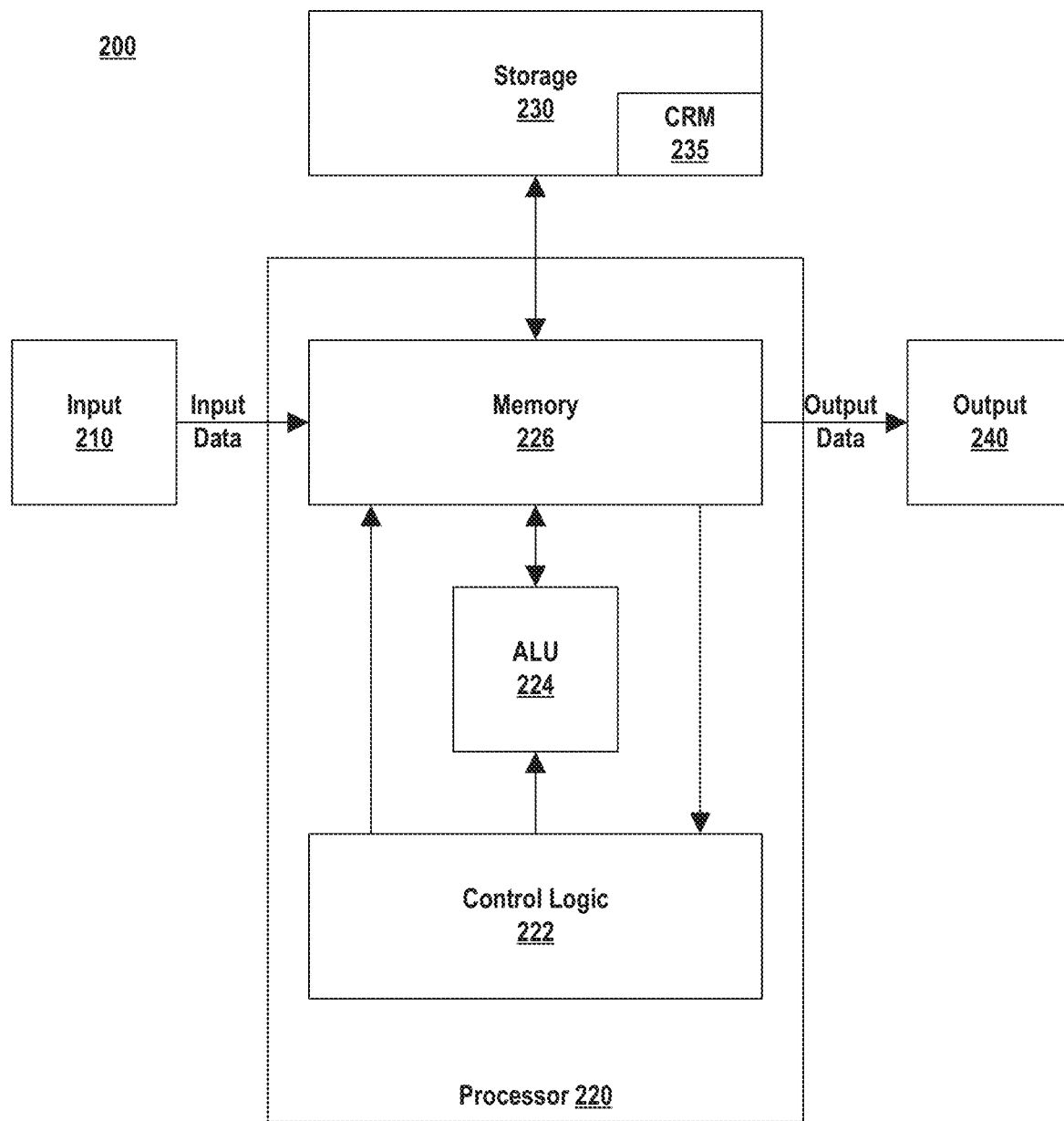
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
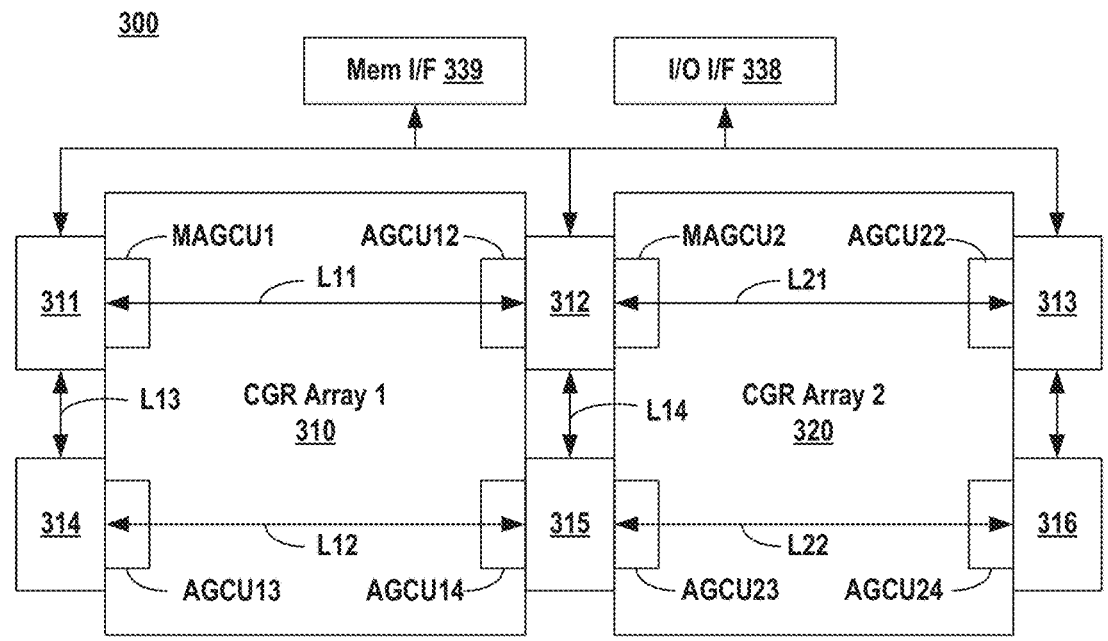
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
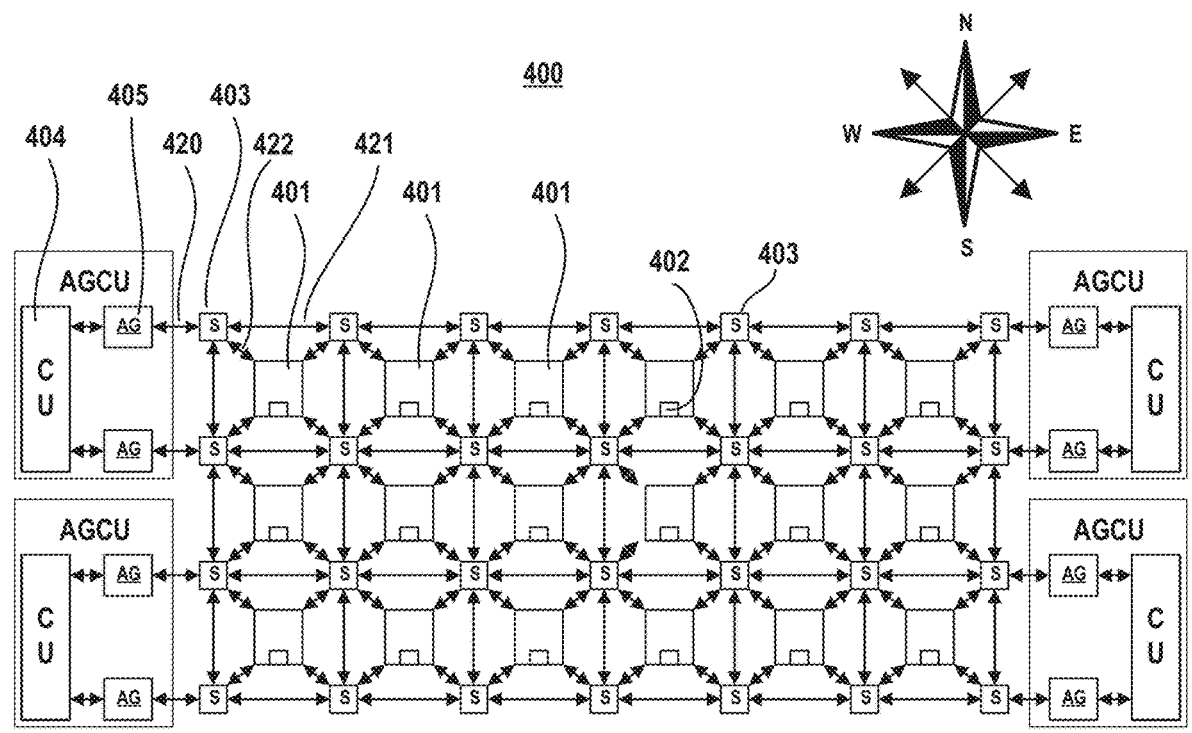
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed by individual stages, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of individual CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of individual packets and other information such as sequence numbers that can be used to reassemble a file when the packets are received out of order. Individual packet headers can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Individual ports may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Individual interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
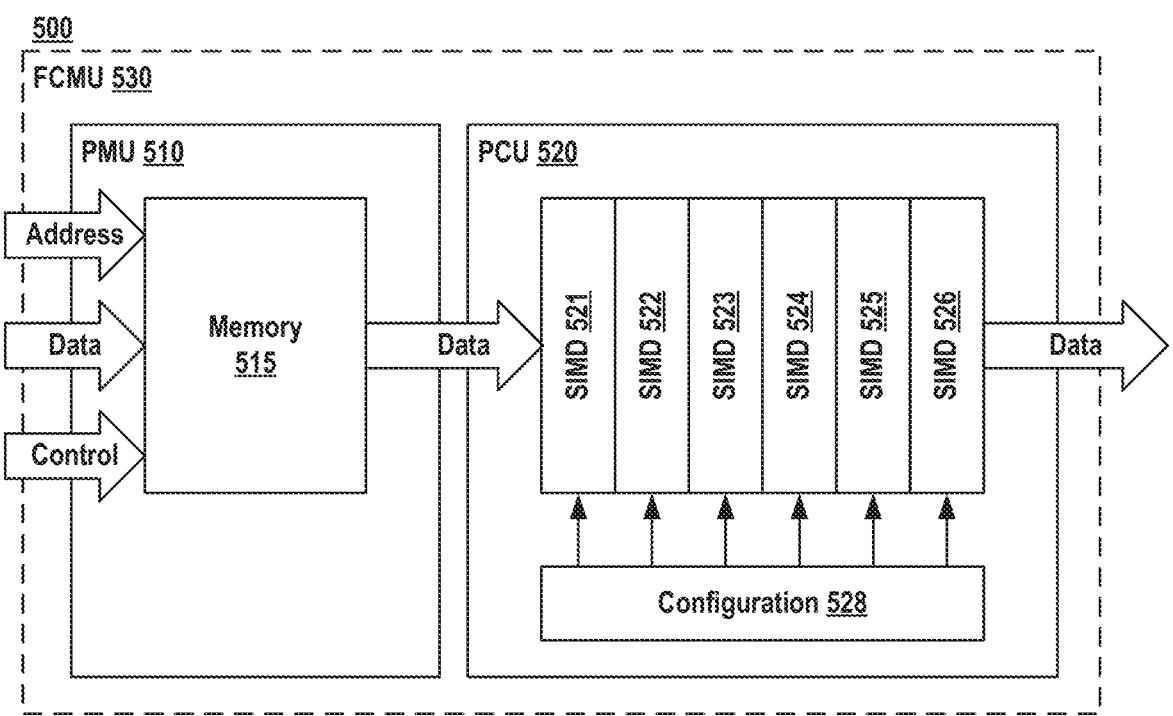
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Individual stages in PCU 520 may also hold one or more registers (not drawn) for short-term storage of parameters.

Short-term storage, for example during one to several clock cycles or unit delays, allows for synchronization of data in the PCU pipeline.

Figure 6:
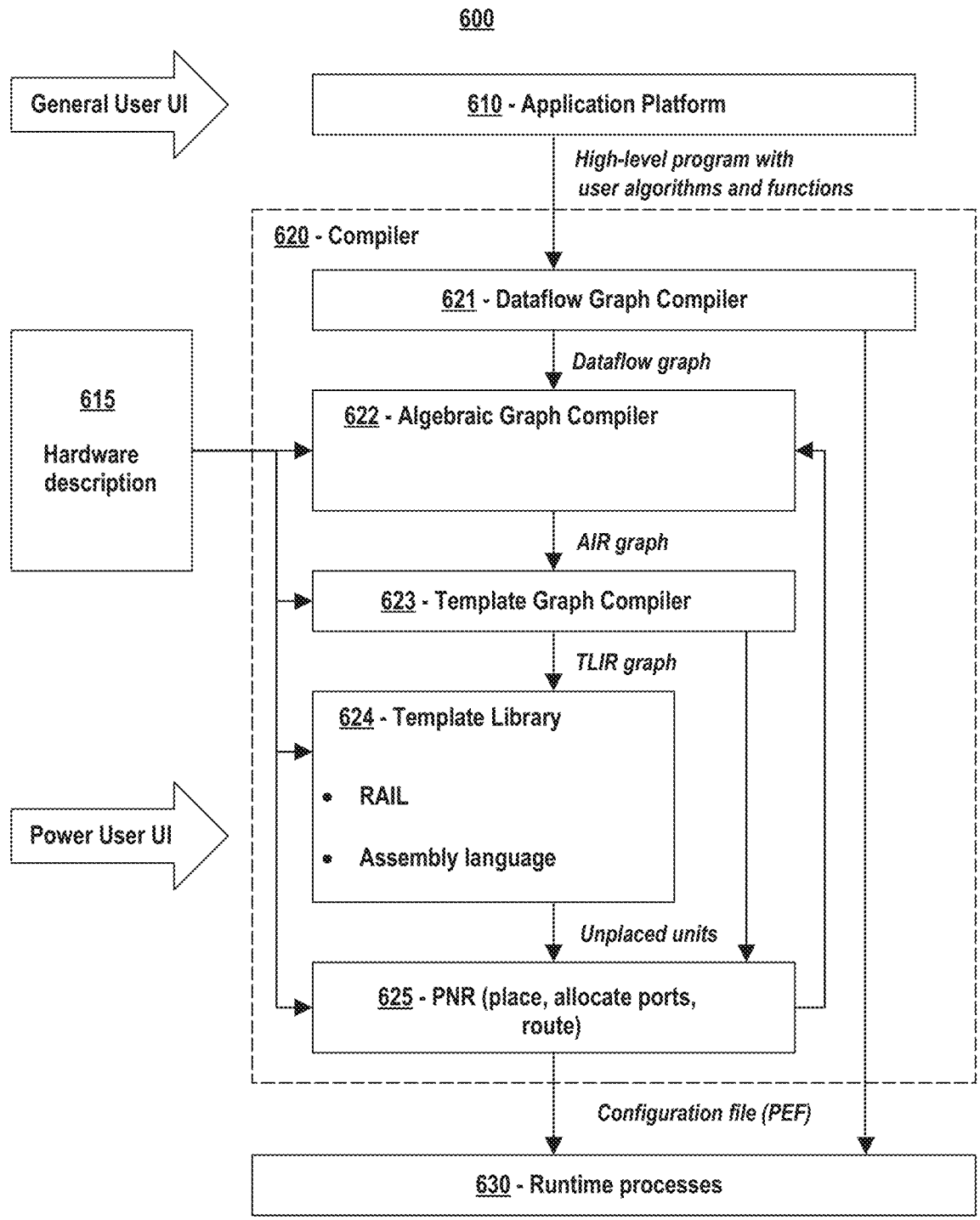
FIG. 6 is a block diagram of a compiler stack implementation suitable for generating a configuration file for a CGR processor.

Referring now to FIG. 6 which is a block diagram of a compiler stack 600 implementation suitable for generating a configuration file for a CGR processor. Referring also to FIGS. 7A-7E which illustrate various representations of an example user program 710 corresponding to various stages of a compiler stack such as the compiler stack 600. As depicted, compiler stack 600 includes several stages to convert a high-level program (e.g., user program 710) with statements 712 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 710 depicted in FIG. 7A comprises statements 712 that invoke various PyTorch functions.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router (PNR) 625. In some implementations, template library 624 includes RDP abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 622 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Figure 7A:
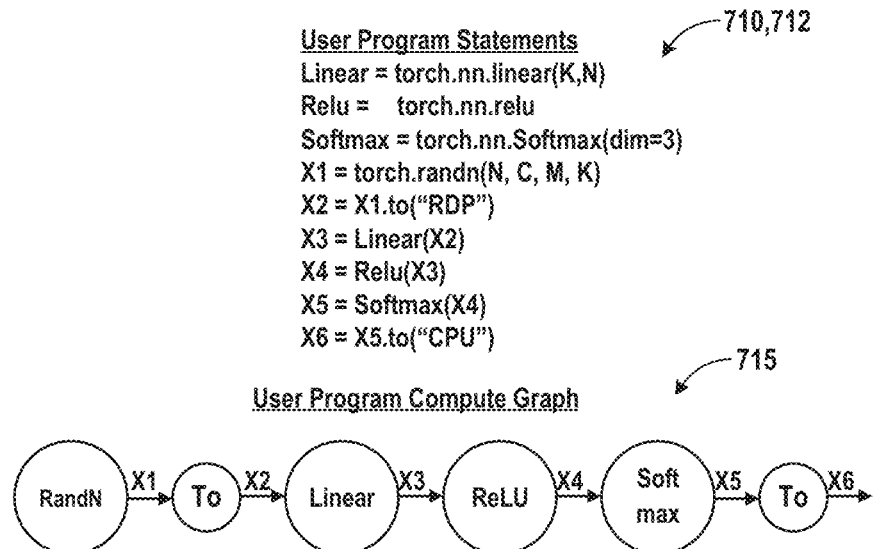
Figure 7B:
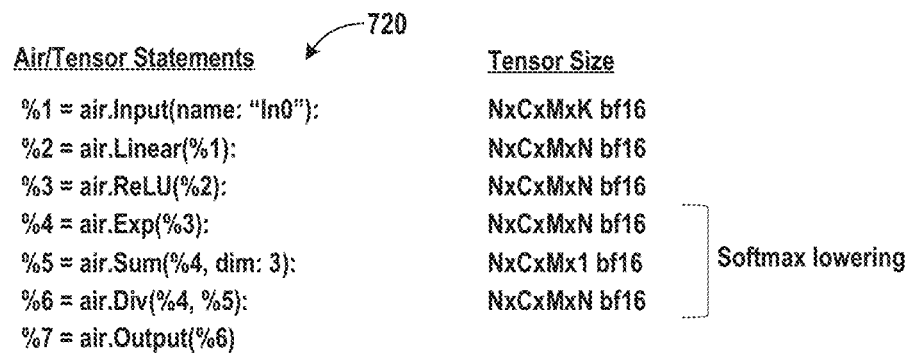
Figure 7B:
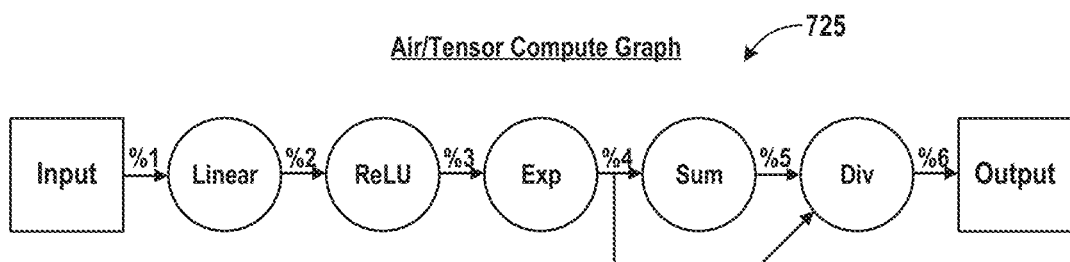

Algebraic graph compiler 622 may further include an arithmetic or algebraic intermediate representation (AIR) stage that translates high-level graph and mapping decisions provided by the MAC level into explicit AIR/Tensor statements 720 and one or more corresponding algebraic graphs 725 as shown in FIG. 7B. In the depicted example, the algebraic graph compiler replaces the Softmax function specified in the user program 710 by its constituent statements/nodes (i.e., exp, sum and div). Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 623 may translate AIR statements and/or graphs into TLIR statements 730 and/or graph(s) 735 (see FIG. 7C), optimizing for the target hardware architecture, into unplaced variable-sized units (referred to as logical CGR units) suitable for PNR 625. Meta-pipelines 732 that enable iteration control may be allocated for sections of the TLIR statements and/or corresponding sections of the graph(s) 735. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 7D:
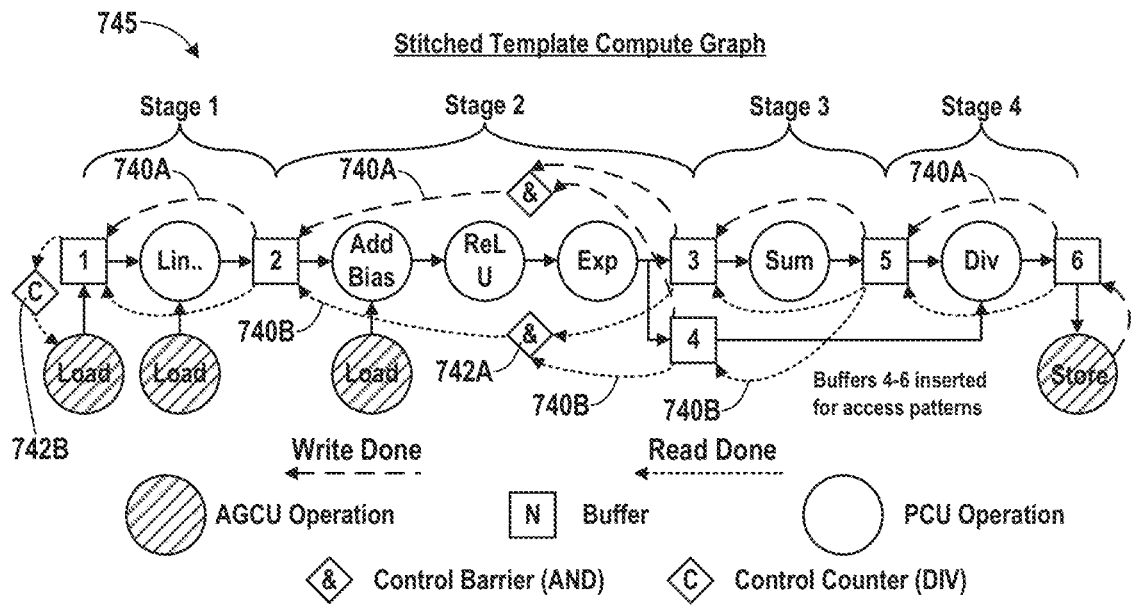
Figure 7E:
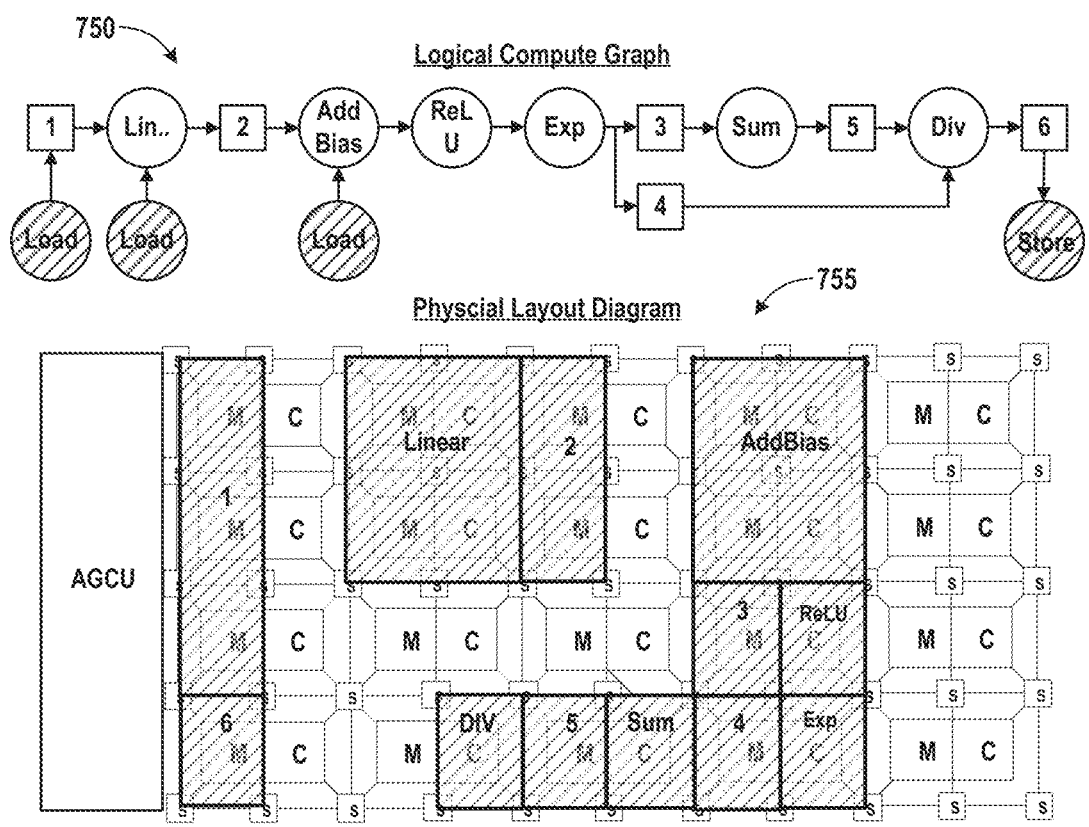

Referring to FIG. 7D, the template graph compiler may also determine the control signals 740 and control gates 742 required to enable the CGR units (whether logical or physical) to coordinate dataflow between the CGR units on the communication fabric of a CGR processor. This process, sometimes referred to as stitching, produces a stitched template compute graph 745 with control signals 740 and control gates 742. In the example depicted in FIG. 7D, the control signals 740 include write done signals 740A and read done signals 740B and the control gates 742 include 'AND' gates 742A and a counting or 'DIV' gate 742B. The control signals 740 and control gates 742 enable coordinated dataflow between the configurable units of CGR processors such as compute units, memory units, and AGCUs.

PNR 625 translates and maps logical (i.e., unplaced physically realizable) CGR units (e.g., the nodes of the logical compute graph 750 shown in FIG. 7E) to a physical layout (e.g., the physical layout 755 shown in FIG. 7E) on the physical chip level e.g., a physical array of CGR units. PNR 625 also determines physical data channels to enable communication among the CGR units and between the CGR units and circuits coupled via the TLN, allocates ports on the CGR units and switches, provides configuration data and initialization data for the target hardware, and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Figure 8:
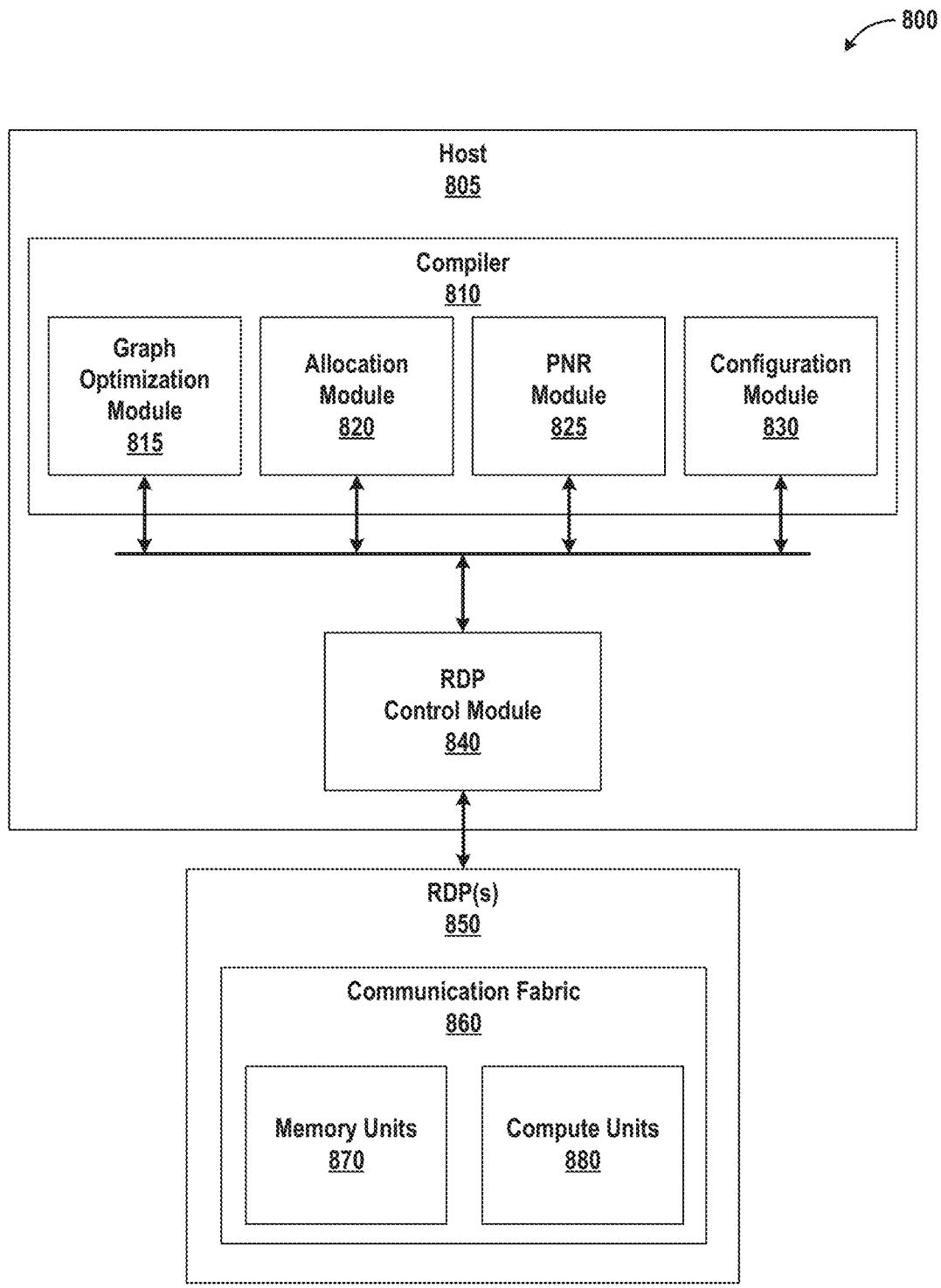
FIG. 8 is a block diagram illustrating one example of a CGR dataflow computing system.

FIG. 8 is a block diagram illustrating one example of a CGR dataflow computing system 800. As depicted, the CGR dataflow computing system 800 includes a graph optimization module 815, an allocation module 820, a place and route module 825, a configuration module 830, a reconfigurable dataflow processor (RDP) control module 840, and one or more RDPs 850 comprising a communication fabric 860, memory units 870 and compute units 880. The CGR dataflow computing system 800 enables evaluation and selection of template configurations as well as placement, routing, configuration and deployment of those configured templates on the configurable units of the reconfigurable dataflow processors (RDPs) 850.

The depicted modules 815-840 may reside within, or be available to (e.g., within a library), a compiler 810 that executes on a host 805 and compiles computing tasks for execution on the RDPs 850. The computing task may be represented with a compute graph and/or code statements that indicate the mathematical operations that are to be executed. The graph optimization module 815 may analyze a compute graph (with a node specifying an operation on a tensor slice) of a computing task and may split a node into multiple nodes that each specify the operation on a distinctive portion of the tensor to reduce latency, increase throughput, and/or optimize resource utilization while maintaining the intended results of the computing task. The allocation module 820 may allocate virtual compute units and memory units to the computing task or a portion thereof and may determine the number of compute units and the number of memory units required to support an operation. The allocation module 820 may function in conjunction with a partitioner (not shown) that partitions the compute graph into executable sub-graphs and inserts virtual memory units (i.e., buffers) into the compute graph that enable dataflow execution of the sub-graphs on reconfigurable dataflow processors such as the RDPs 850.

The place and route module 825 may generate multiple placement graph options corresponding to the computing task and select the placement graph that best meets the objectives and resources of the RDPs 850. For example, in some situations throughput may be the primary objective while in other situations, minimizing consumed resources may be the primary objective. The placement graphs may specify physical compute units, memory units and switch units that correspond to the virtual units of the executable sub-graph. To reduce communication distance and latency, the specified physical compute units, memory units and switch units may be neighbors in a computing grid on an RDP 850.

The configuration module 830 may generate configuration information for the configuration units specified in the selected placement graphs. The RDP control module 840 may communicate the configuration information to the RDPs 850 and initiate dataflow in the computing grid. The communication fabric 860 may comprise switch units (not shown) that enable communication between the RDP control module 840 and memory units 870 and compute units 880 within the RDP(s) 850. One of skill in the art will appreciate that the placement graphs specified for execution may be relocated at runtime to a currently available RDP and/or a currently available region with a computing grid (e.g., tile) of an RDP. The relocation may preserve the relative positions and connectivity of the configurable units specified by the placement graphs and enable concurrent execution of multiple placement graphs.

Figure 9:
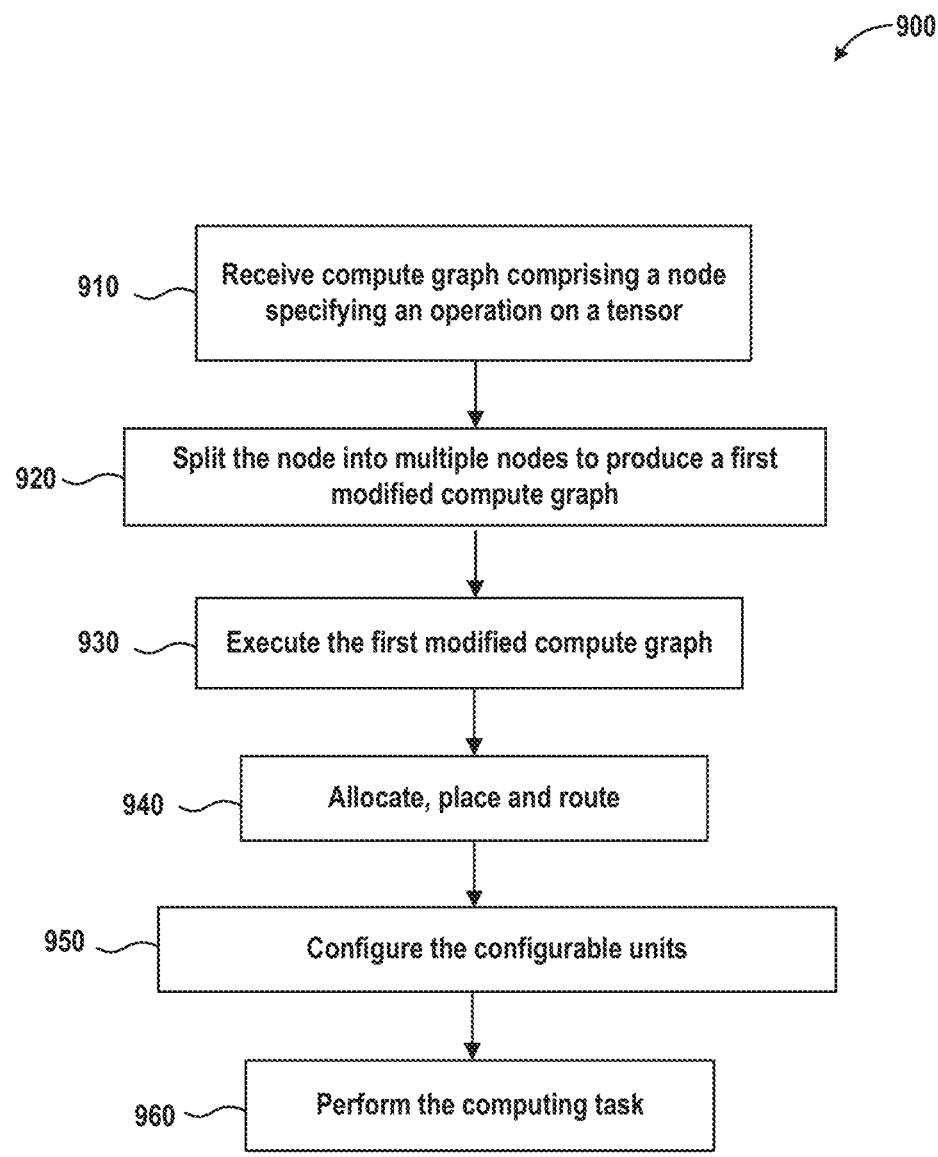
FIG. 9 is a flowchart of one example of a graph spatial split method for a CGR dataflow computing system.

FIG. 9 is a flowchart of one example of a graph optimization method 900 for a CGR dataflow computing system. As depicted, the graph optimization method 900 includes receiving (910) a compute graph comprising a node, splitting (920) the node to produce a first modified compute graph, executing (930) the first modified compute graph, allocating, placing, and routing (940) configurable units, configuring (950) the configurable units, and performing (960) the computing task. The graph optimization method 900 enables reduced latency within that meta-pipeline stage and increased throughput of that stage and contributes to overall performance improvement in a CGR dataflow computing system. The graph optimization method 900 may provide smaller sections of the graph to be processed in parallel, which can balance computation with minimum data-transfer overhead.

Receiving (910) a compute graph may include receiving a compute graph for execution on a reconfigurable dataflow computing system. The reconfigurable dataflow computing system may comprise a grid of compute units and a grid of memory units interconnected with a switching array. The compute graph may comprise a node specifying an operation on a tensor.

Splitting (920) the node to produce a first modified compute graph may include splitting the node into multiple nodes to produce a first modified compute graph. The node may be spatially split into multiple parallel nodes that each specify the operation may be performed in parallel on a distinctive portion of the tensor, and thereby a first modified computer graph is produced. One having skill in the art will appreciate that splitting the node into multiple parallel nodes each specifying the operation on a distinctive portion of the tensor may reduce latency (within that meta-pipeline stage comprising the multiple parallel nodes).

Executing (930) the first modified compute graph may include tensor flow through a collection of nodes connected by edges. Each meta-pipeline stage may comprise the multiple nodes (from splitting the node) that are executable via tensor flow through one or more compute units of the grid of compute units. Each meta-pipeline stage may receive or provide a tensor via at least one memory unit from the grid of memory units. Tensor flow through each meta-pipeline stage may be controlled by the least one memory unit from the grid of memory units. For example, the at least one memory unit that corresponds to a final stage within a meta-pipeline may provide a control signal that controls tensor flow through the meta-pipeline. Other stage memory units within the meta-pipeline may provide and/or receive data in response to the control signal.

Allocating, placing and routing (940) configurable units may include placing memory units and compute units and routing connections that enable dataflow between the memory units and compute units.

Configuring (950) the configurable units may include configuring the reconfigurable units of the reconfigurable computing grid. In conjunction therewith, configuring (960) the configurable units may include determining the configuration information for configurable units of the reconfigurable computing grid and communicating the configuration information to one or more RDPs 850 (e.g., via the RDP control module 840). Performing (960) the computing task may include initiating dataflow within the reconfigurable computing grid via the RDP control module 840.

Figure 10:
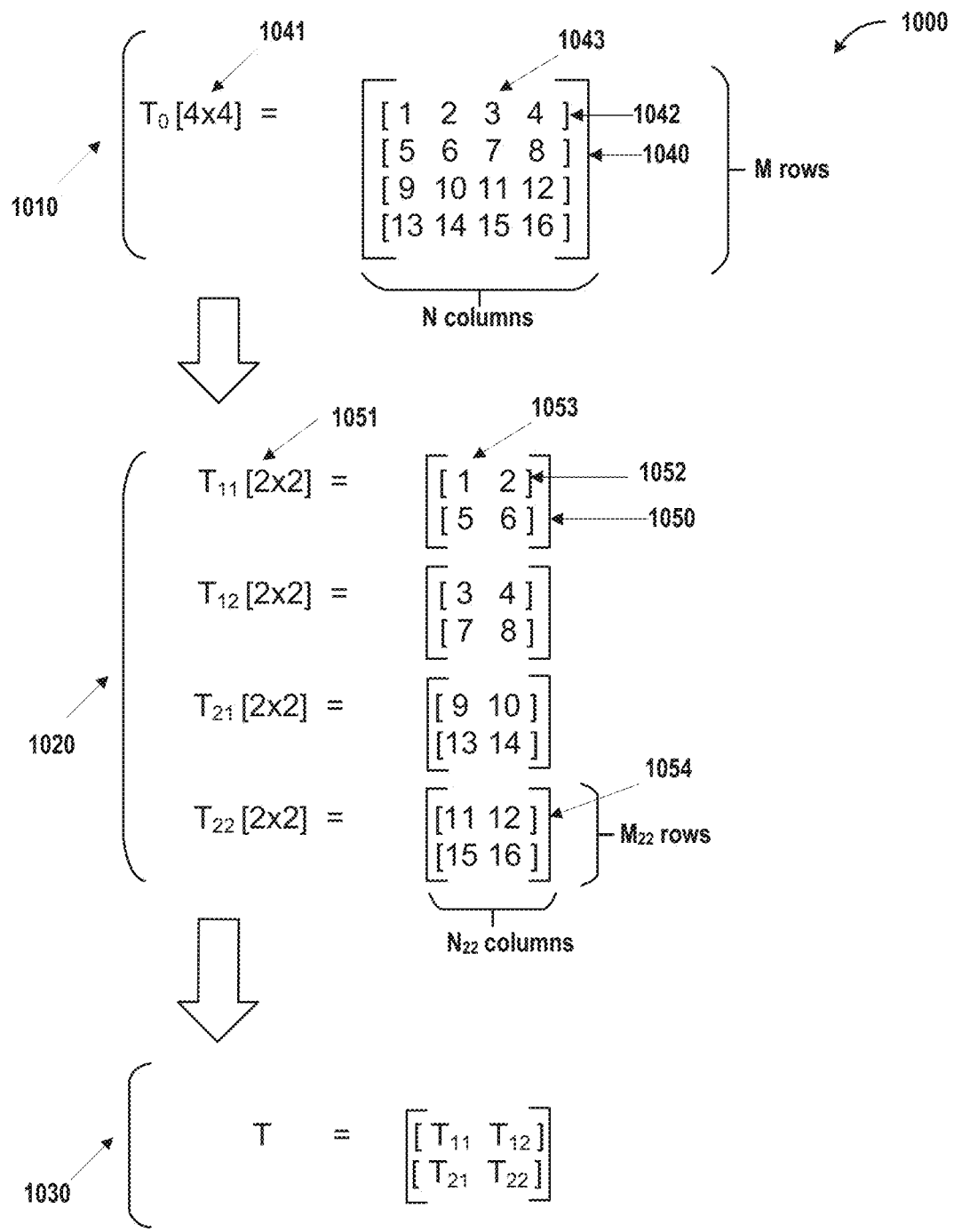
FIG. 10 shows one example of tensor partitioning in graph spatial split methods.

FIG. 10 shows one example of tensor partitioning 1000 in accordance with the graph spatial split methods for a CGR dataflow computing system disclosed herein. As depicted, the diagram 1000 comprises an original tensor 1010 that may be spatially partitioned 1020 and then written as the final partitioned tensor 1030, labeled as T. The original tensor 1040, labeled as To and having original dimensions 1041 (for example, 4×4), may be comprised of one or more original sub-tensors 1042 that may include at least one individual element 1043. As depicted, the original tensor 1040 has M rows and N columns. A sub-tensor 1042 may have spatially distinct number of rows and/or columns from the original tensor 1040.

A tensor may be spatially partitioned into one or more block tensors 1020. A block tensor 1050 may include sections 1052 of the original sub-tensors 1042, such that a block tensor 1050, labeled as $T_{11}$ may have a new dimension 1051 (for example, 2×2). Section 1052 of block tensor 1050 may contain at least one individual element 1053. As depicted, block tensor 1054 has $M_{22}$ rows and $N_{22}$ columns (a section 1052 may have different row and/or column values). A Pattern Compute Unit (PCU) may have access to sets of rows and/or columns for each of the block tensors 1020 and/or for each section 1052.

A block tensor 1050 may be visualized as the original tensor 1010 with a collection of horizontal and/or vertical lines that partition the original tensor 1010 into a collection of smaller tensors. The original tensor 1010 may be interpreted as a block tensor 1050 in several different ways, with each interpretation defined by the specified dimensional partitioning. The original tensor 1010 is a composition of the partitions. An individual element 1043 of the original tensor 1010 corresponds in a 1:1 manner with an individual element 1053 of the block tensor 1050.

Original tensor 1010 may map to a Pattern Compute Unit (PMU). Original tensor 1010 may be partitioned into tensor blocks 1020 within a PMU to increase parallelism in the hardware. For example, to implement Multiple Instruction/Multiple Data (MIMD) style parallelism, several PCUs may operate on different tensor blocks 1020 within the PMU, simultaneously.

Tensor partitioning may also reduce tensor spilling issues. A tensor's size (in the input graph or in combination with intermediate results) may exceed the size of local PMUs, so the original tensor 1010 may spill into non-local memory, which attenuates performance gains from PCUs. For example, consider tensor, T, such that T=Convolution ($T_1$, $T_2$). $T_1$ may be a large tensor that cannot fit into local buffer-memory (allocable PMUs) and $T_2$ may be a tensor. $T_1$ may be split into smaller sub-tensors $T_{11}$ and $T_{12}$. The Convolution operation may be split into individual convolution operations, Convolution)=convolution ($T_{11}$, $T_2$) and Convolution2=convolution ($T_{12}$, $T_2$). The final Convolution operation may be synthesized from these individual convolution operations, such that the synthesis may include a separate operation, such as concatenation or summation operations.

An exemplary hardware implementation of block tensors 1020 may include using a form of block arithmetic to expedite matrix multiplication by treating the whole multi-unit dot product as an atomic operation (for example, by using 32-bit 8-unit dot products or 16-bit 16-unit dot products). Specifically, by using 32-bit 8-unit dot products, large tensors may be decomposed into 8×8 tensor blocks to focus on 8-element dot products; and 64 dot products may effectively implement 8×8 matrix multiplication. Vectors with 8-elements may be multiplied in a pairwise manner and then added to obtain the result. Floating point sums may be simplified by normalizing 8 full-precision products to the largest of 8 exponents, so subsequent additions are performed without shifts.

Figure 11:
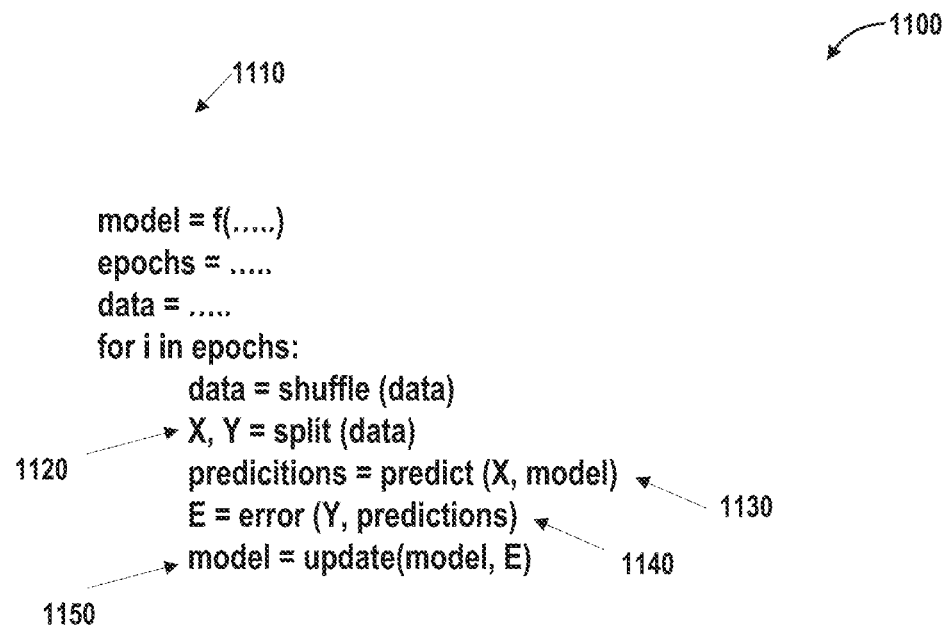
FIG. 11 is a set of code statements illustrating one example of a spatial tensor slicing operation in a gradient descent optimization algorithm.

FIG. 11 is a set of code statements 1100 of one example of an optimization algorithm 1110, gradient descent, that may require a spatial tensor slicing operation 1120 that splits the tensor into two slices or sub-sections. For example, a first tensor slice 1130 ("X") may enable the model to make predictions on training data, and a second tensor slice 1140 ("Y") may enable the error value for these predictions to update the model to minimize the model's error. One having skill in the art will appreciate that gradient descent can vary in the number of training patterns used to calculate errors, which in turn, update the model.

Spatial tensor slicing may be useful for applications with large neural network (NN) operators (nodes) that may be partitioned into smaller operators. For example, tensor slicing may perform word masking while training in natural language processing (NLP) applications. Specifically, training data may be generated from a list of sentences by selecting a word index to mask in each sentence, extracting the word as a label, and then replacing the selected word with a mask token.

In another example, machine learning (ML) applications, such as object detection or NLP, may require performing operations on sub-sections (or slices) of tensors. More specifically, if the model architecture includes routing, then one layer may control a training example that can be routed to the next layer. Here, tensor slicing operations may split tensors and the split tensors are then assembled back together in the correct order.

Figure 12:
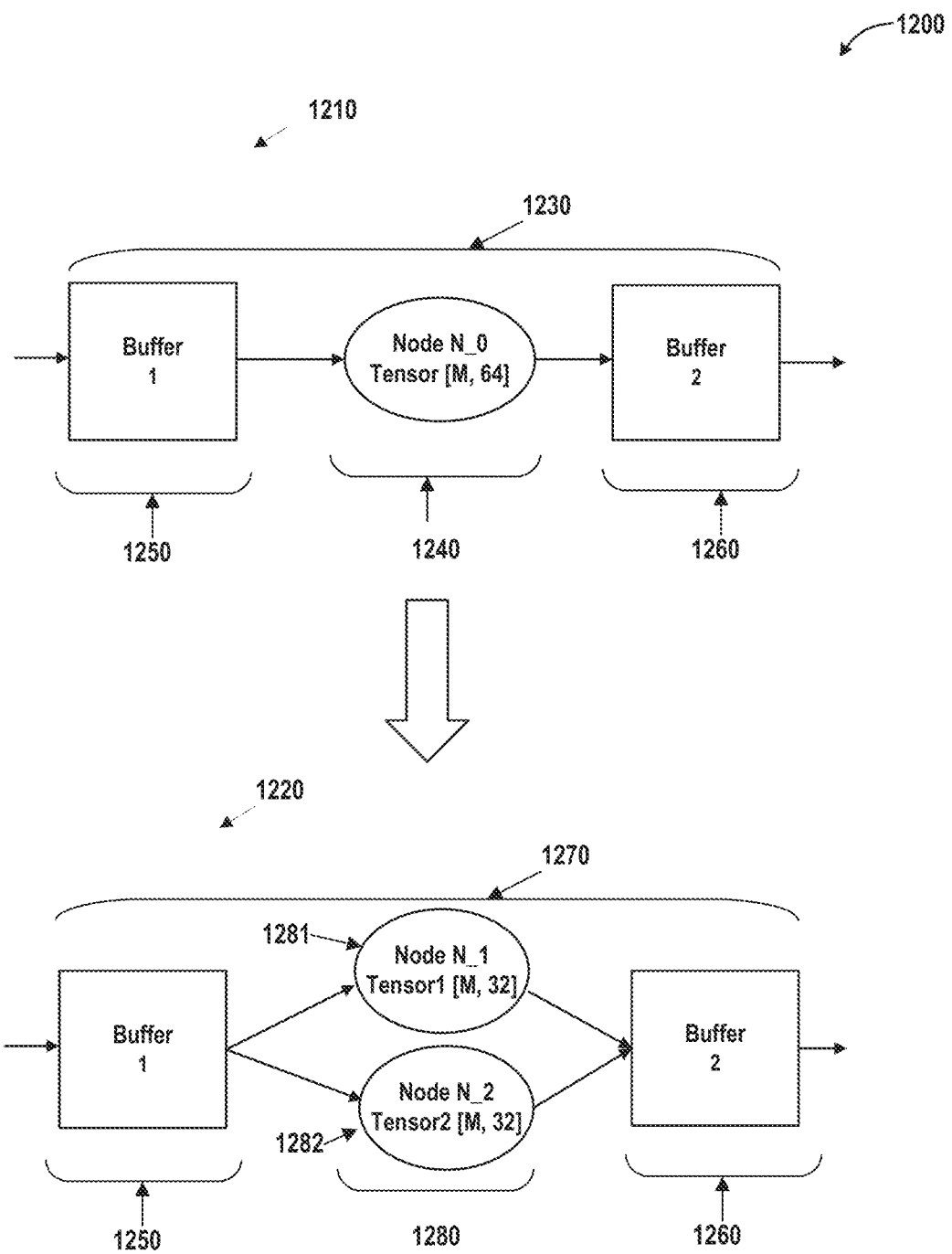
FIG. 12 is a graph diagram of one example of splitting an operation node in a graph spatial split.

FIG. 12 is a set of before and after compute graphs 1200 of one example of graph optimization for a CGR dataflow computing system. As depicted, compute graphs 1200 comprise a before-compute graph 1210 that is optimized to produce a first modified compute graph 1220. One having skill in the art could appreciate that the following described optimizations could be adapted for code statements rather than a compute graph.

A first meta-pipeline stage 1230 within a before-compute graph 1210 may comprise operation node 1240 that specifies an operation on a large tensor (for example, Tensor [M, 64]). First meta-pipeline stage 1230 may comprise a producer stage boundary buffer 1250 and consumer stage boundary buffer 1260, and each stage boundary buffer may hold a sliced sub-element of a tiled tensor. Producer stage boundary buffer 1250 and consumer stage boundary buffer 1260 may provide tensor slices to and receive tensor slices from, respectively, operation node 1240. First meta-pipeline stage 1230 has a latency of L before the graph split.

During graphical spatial split optimization 1200, the operation node 1240 may be split into multiple operation nodes 1280. The second meta-pipeline stage 1270 corresponding to the spatially split graph may include multiple (parallel) operation nodes 1280. Each of the multiple (parallel) operation nodes 1280 specifies the operation on a distinctive portion (or sliced sub-element) of the tensor to produce a first modified compute graph 1220. The first modified compute graph 1220 may then be executed.

In a further embodiment (not depicted), graphical spatial split may be performed on a selected number of nodes in a compute graph, and each node of the selected number of nodes may be located at various positions within the compute graph. Upon splitting each node of the selected number of nodes, each node of the selected number of nodes may be split into multiple (parallel) operations nodes (i.e., like the multiple parallel operation nodes 1280) to produce a selected number of multiple (parallel) operation nodes located at various positions within the new compute graph.

The depicted example shows an operation node 1240 (Node N_0), which specifies an operation on Tensor [M, 64] in first meta-pipeline 1230, may be spatially split into two parallel operation nodes, a first split operation node 1281 (Node N_1) and a second split operation node 1282 (Node N_2), that each specify the operation on distinct split-tensors, Tensor1 [M, 32] and Tensor2 [M, 32].

In this example, operation node 1240 may be split into two parallel nodes (1281 and 1282), so the second meta-pipeline stage 1270 may have a reduced latency of L/2 after graph spatial splitting. Generally, splitting an operation node into "X" multiple (parallel) operation nodes may improve latency by L/X (L divided by X) for that meta-pipeline stage. In general, splitting the operation nodes into multiple parallel nodes (that specify the operation) and partitioning the tensor into smaller sections to process smaller sections of the graph in parallel, may reduce the latency of the meta-pipeline stage, as well as improve the throughput of the meta-pipeline stage and improve overall performance.

As a physical layout, producer stage boundary buffer 1250 and consumer stage boundary buffer 1260 delineate a single meta-pipeline stage. Each stage boundary buffer may hold two entries, each entry being a tensor. Each tensor may map to more than one PMU. Each stage boundary buffer may serve as local memory to hold sliced tensors for a PCU that performs operations on tensors. Each node (for example, operation node 1240 or operation node 1281) may correspond to one or more PCUs.

Splitting may be accomplished by disconnecting the operation node 1240 (Node N_0) from both the producer stage boundary buffer 1250 (Buffer 1) and consumer stage boundary buffer 1260 (Buffer 2) in the first meta-pipeline stage 1230. Then, the operation node 1240 (Node N_0) may be split. Next, in the second meta-pipeline stage 1270, the producer stage boundary buffer 1250 (Buffer 1) may be connected to the first split operation node 1281 (Node N_1), which may be connected to the consumer stage boundary buffer 1260 (Buffer 2); and similarly, the producer stage boundary buffer 1250 (Buffer 1) may be connected to the second split operation node 1282 (Node N_2), which may be connected to consumer stage boundary buffer 1260 (Buffer 2). The resulting first modified graph may reduce data transfer overhead, which can reduce latency of the first meta-pipeline stage 1230.

Figure 13:
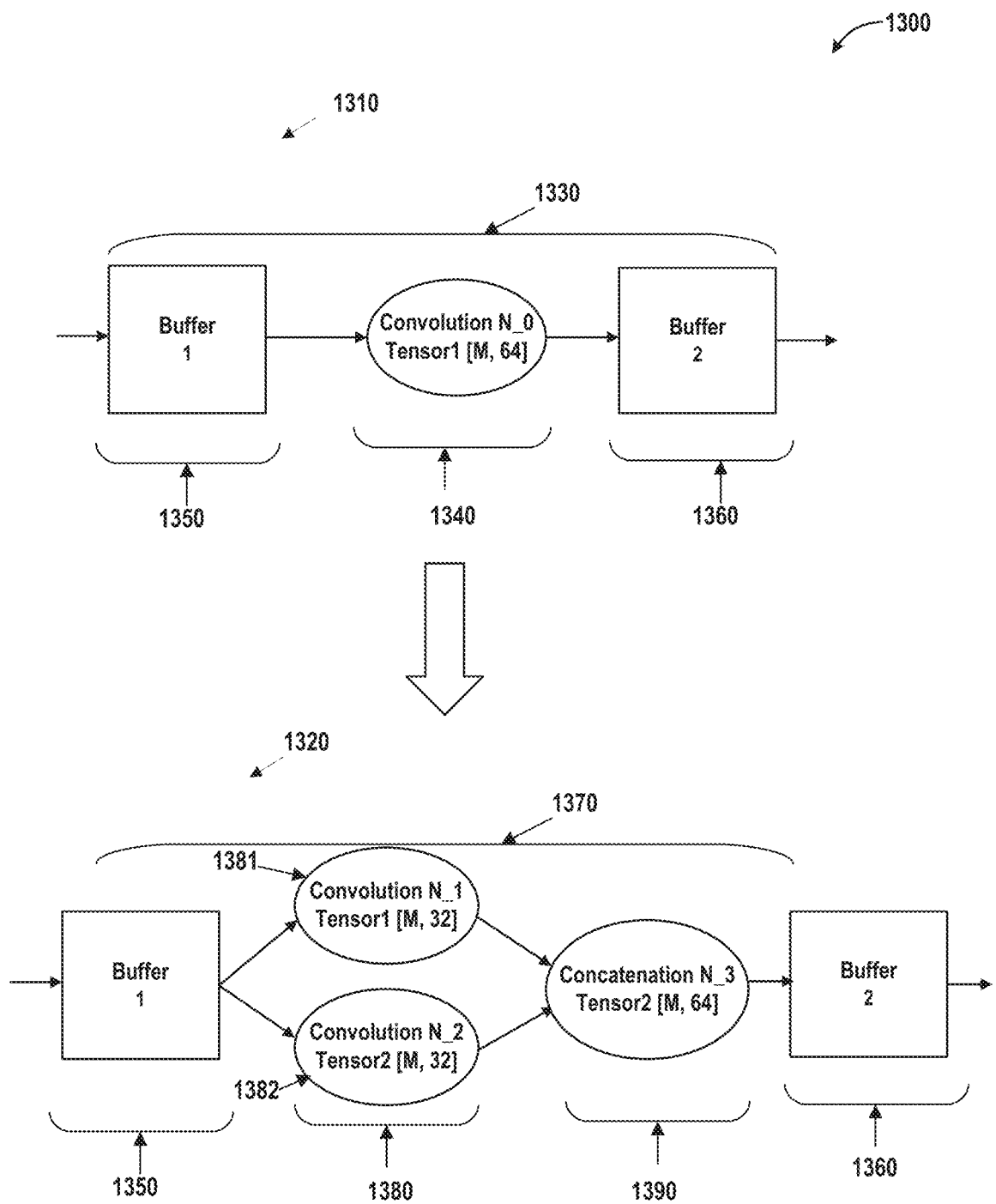
FIG. 13 is a graph diagram of one example of splitting an operation node in a graph spatial split.

FIG. 13 is a set of before and after compute graphs 1300 of one example of graph optimization for a CGR dataflow computing system. As depicted, the compute graphs 1300 comprise a before-compute graph 1310 that is optimized to produce a second modified compute graph 1320. One having skill in the art will appreciate that the following described optimizations could be adapted for code statements rather than a compute graph.

A first meta-pipeline stage 1330 within a compute graph may comprise an operation node 1340 (Convolution N_0) that specifies an operation on a large tensor (for example, on Tensor1 [M, 64]). The first meta-pipeline stage 1330 may comprise a producer stage boundary buffer 1350 and consumer stage boundary buffer 1360, and each stage boundary buffer may hold a sliced sub-element of a tiled tensor. Producer stage boundary buffer 1350 and consumer stage boundary buffer 1360 may provide tensor slices to and receive tensor slices from, respectively, operation node 1340. The first meta-pipeline stage 1330 has a latency of L before the graph split.

During the graphical spatial split optimization 1300, an operation node 1340 may be split into multiple operation nodes 1380. The second meta-pipeline stage 1370 of the spatially split graph may include multiple (parallel) operation nodes 1380. Each of the multiple operation nodes (1381 and 1382) specifies the operation on a distinctive portion (or sliced sub-element) of the tensor. The multiple parallel operation nodes 1380 may be combined by concatenation operation node 1390 (Concatenation N_3) to gather the distinctive portions of the tensor into a complete tensor to produce a second modified compute graph 1320. The second modified compute graph 1320 may then be executed.

The depicted example shows an operation node 1340 (Convolution N_0), which specifies an operation on Tensor1 [M, 64] in the first meta-pipeline stage 1330, may be spatially split into two parallel operation nodes, the first split operation node 1381 (Convolution N_1) and second split operation node 1382 (Convolution N_2), that each specify the operation on distinct split-tensors, Tensor1 [M, 32] and Tensor2 [M, 32]. Then, the first split operation node 1381 (Convolution N_1) and second split operation node 1382 (Convolution N_2) may be combined by a separate operation node 1390 (Concatenation N_3) to gather the distinctive tensor portions (Tensor1 [M, 32] and Tensor2 [M, 32]) into a complete tensor (Tensor2 [M, 64]).

In this example, the second meta-pipeline stage 1370 comprises two parallel split operation nodes (1381 and 1382), followed by a separate operation node 1390. As a result, the second meta-pipeline stage 1370 has a reduced latency of L/2, corresponding to the parallel split nodes, with an additional latency cost of $L_{concat}$ corresponding to (concatenation) operation node 1390. After graph spatial split, the latency of the second meta-pipeline stage 1370 is L/2+ $L_{concat}$.

Generally, splitting an operation node into "X" multiple nodes may improve latency of the meta-pipeline stage by L/X (L divided by X), with an additional latency cost, attributed to the separate operation node for combining the split nodes. The separate operation node may correspond to a concatenation operation, a summation operation, or a tensor assembly operation.

In the depicted embodiment, splitting may be accomplished by disconnecting the operation node 1340 (Convolution N_0) from the producer stage boundary buffer 1350 (Buffer 1) and consumer stage boundary buffer 1360 (Buffer 2) in a first meta-pipeline stage 1330. Then, the operation node 1340 (Convolution N_0) may be split. Next, in the second meta-pipeline stage 1370, a producer stage boundary buffer 1350 (Buffer 1) may be connected to the first split operation node 1381 (Convolution N_1), which may be connected to the gathering operation node 1390 (Concatenation N_3); and similarly, a producer stage boundary buffer 1350 (Buffer 1) may be connected to the second split operation node 1382 (Convolution N_2), which may be connected to the gathering operation node 1390 (Concatenation N_3). Finally, the operation node 1390 (Concatenation N 3) may be connected to consumer stage boundary buffer 1360 (Buffer2).

As a physical layout, the producer stage boundary buffer 1350 and consumer stage boundary buffer 1360 delineate one meta-pipeline stage. Each stage boundary buffer may hold two entries, each entry being a tensor. Each tensor may map to more than one PMU. Each stage boundary buffer may serve as a local memory to hold sliced tensors for a PCU that performs operations on tensors. Each node (for example, operation node 1340 or operation node 1381) may correspond to one or more PCUs.

Figure 14:
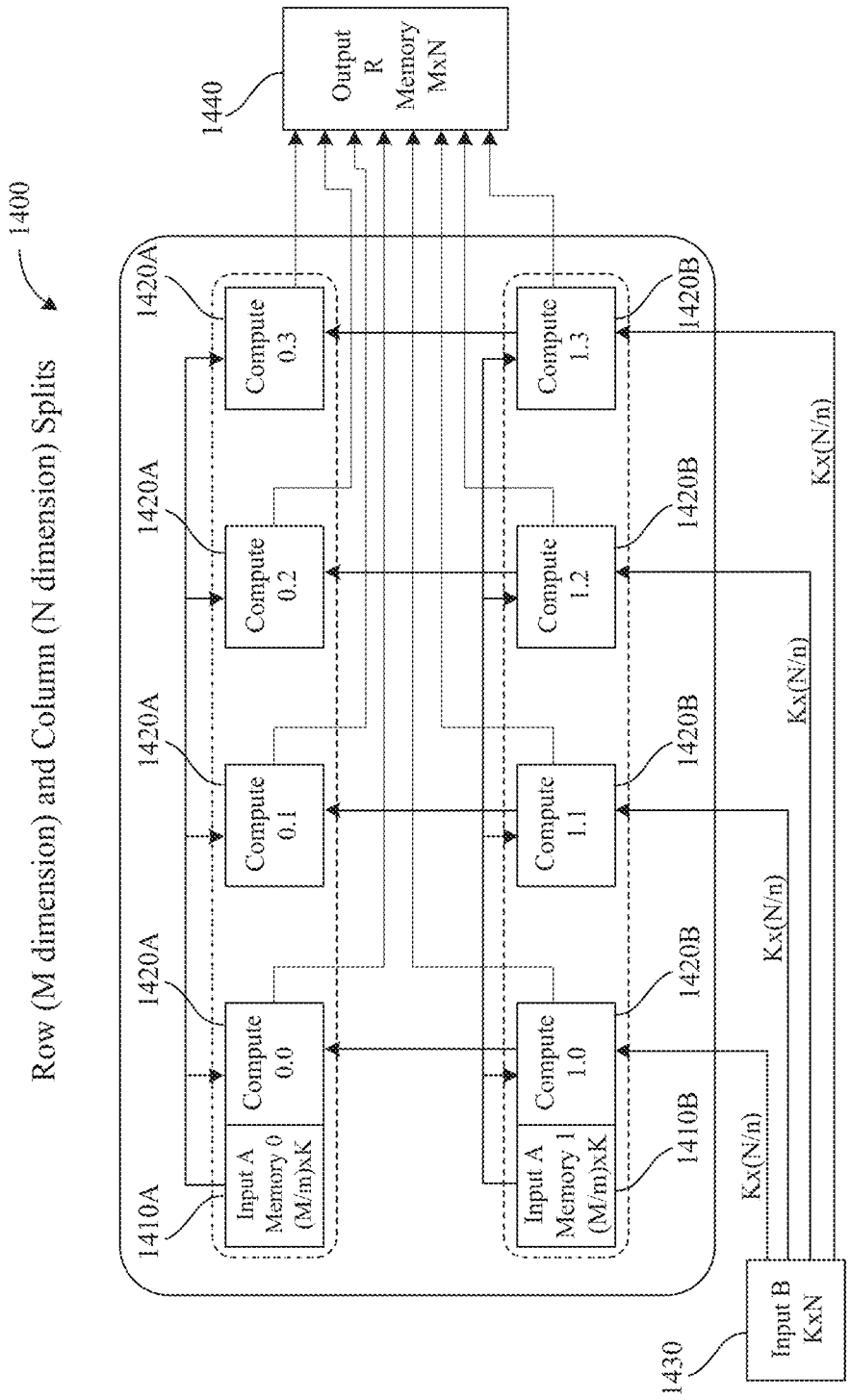
FIG. 14 shows one example of distributing tensors in an example grid computing environment.

FIG. 14 shows one example of distributing tensors in an example grid computing environment. As depicted, tensor A data may be distributed to memory units 1410 that are each (tightly) coupled to, and dedicated to, a row of compute units 1420. Tensor B may be stored in a single memory unit 1430 and tensor R may be stored in a single (grid connected) memory unit 1440. The compute grid may have m rows and n columns (m×n). Tensor A and tensor R may comprise M rows, whereas tensor B and tensor R may comprise N columns.

In the depicted example, memory unit 1410A is coupled to (a first row of) compute units 1420A, memory unit 1410B is coupled to (a second row of) compute units 1420B and M/m (i.e., half of the) rows of tensor A are provided to each row of compute units 1420 in K sequentially streamed vector packets comprising tensor A. For example, graph spatial split may be implemented by increasing the number of operation nodes (or compute units) and by providing smaller tensor blocks or partitions for processing by the compute units.

In contrast, tensor B data may be narrowcast, as needed, to a specific set of compute units. For example, all of the compute units in a column of a (virtual or physical) computing grid may be provided with specific (e.g., N/n) columns from tensor B that correspond to their assigned sub-tensor. The specific columns may be sent (i.e., narrowcast) from one or more memory units 1430 via a set of K packets that are intended only for those compute units. Consequently, in the described embodiment, each of the compute units in the grid need only be provided with and receive those packets that contain those columns of tensor B that correspond to their assigned sub-tensor. Narrowcasting may be implemented in graph spatial split, for example, to provide smaller tensor blocks or partitions that may be split along the column direction for processing by multiple parallel operation nodes (corresponding to an increased number of compute units).

In the depicted embodiment, tensor B may be stored in a single memory unit 1430 and tensor R may be stored in a single (grid connected) memory unit 1440. However, tensor B and/or tensor R, may be spread across multiple memory units 1430/1440. In those embodiments, an interposer memory unit (not shown) may be used to retrieve tensor B data and distribute the data to the appropriate compute units as needed. Similarly, an interposer memory unit (not shown) may be used to receive tensor R data from the compute units and distribute the data to the appropriate memory units that are selected to (at least temporarily) store tensor R.

As shown in FIG. 14, tensor A data may be preferably partitioned by rows into separate memory units for each row of compute units. In contrast, tensor B data may be broadcast to all compute units or narrowcast to each column of compute units by a similar partitioning of the tensor B data by columns.

Figure 15:
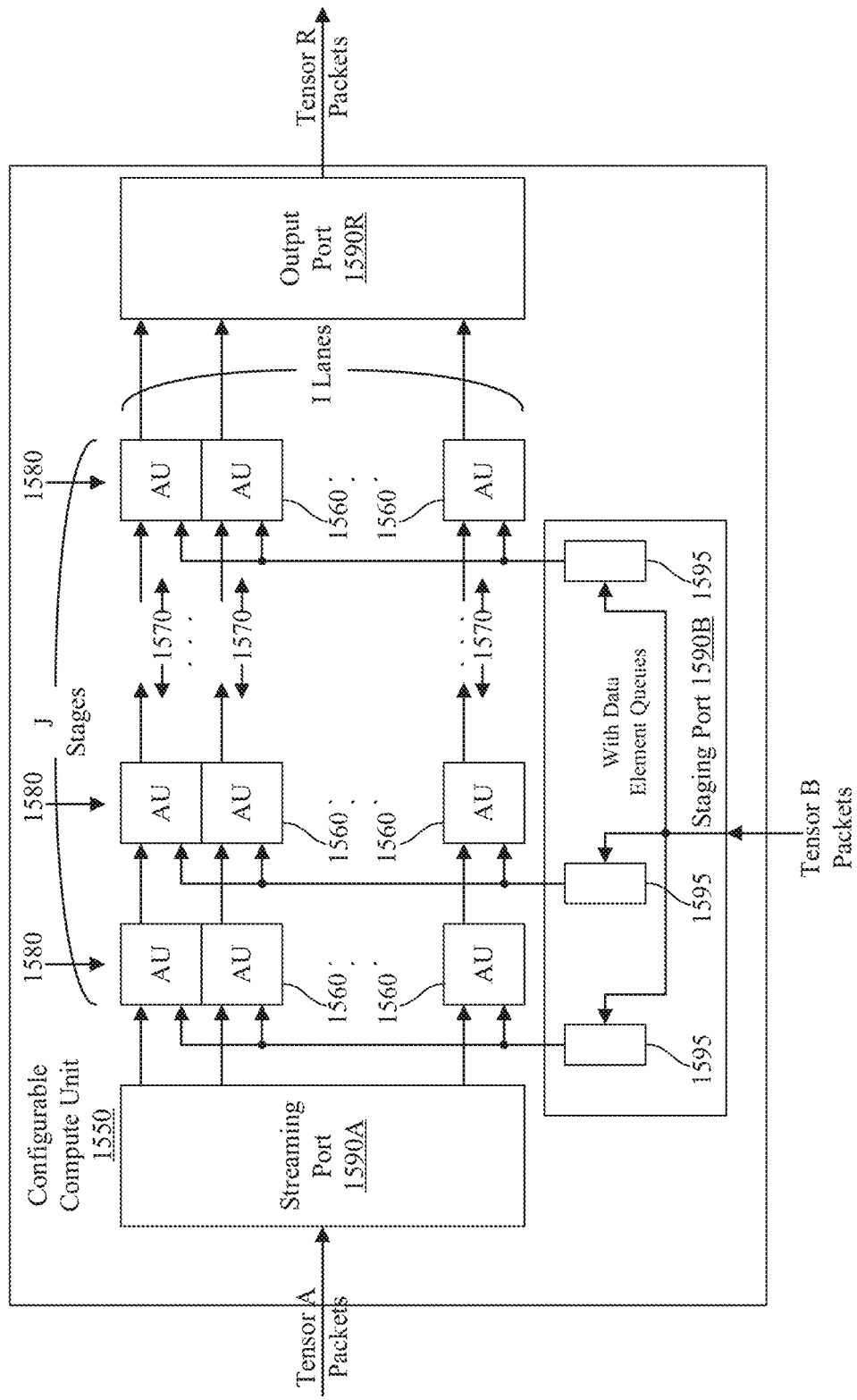
FIG. 15 is a block diagram illustrating one example of a compute unit configurable for the graph spatial split methods disclosed herein.

FIG. 15 is a block diagram illustrating one example of a compute unit 1550 configurable for tensor operations. As depicted, the compute unit 1550 includes an array of arithmetic units 1560 organized into I lanes 1570 and J (pipelined) stages 1580. The compute unit 1550 also includes a set of ports 1590 including a streaming port 1590A that receives packets of tensor A data, a staging port 1590B that receives packets of tensor B data, and an output port 1590R that provides packets of tensor R data. A packet of tensor A data and a packet of tensor R data may correspond to a tensor block with M rows, whereas a packet of tensor B data and a packet of tensor R data may correspond to a tensor block with N columns.

The streaming port 1590A may be configured to sequentially stream K vector packets comprising tensor A data through the I lanes of the array of arithmetic units 1560. Each of the K vector packets may comprise I column-ordered data elements corresponding to I rows of tensor A data. Alternatively, each of the K vector packets may comprise I column-ordered data elements corresponding to I columns of tensor A data. In one embodiment, a row connected memory unit is configured to stream the I rows of tensor A data by providing the K vector packets to the compute unit 1550 and other compute units 1550 on the same row of a computing grid that are assigned to perform the tensor operation.

The staging port 1590B may be configured to receive J vector packets corresponding to J columns of tensor B data and sequentially provide a data element from each of the J vector packets to a corresponding stage of the array of arithmetic units 1560. The J vector packets may be received by a set of J data element queues 1595 that sequentially provide one data element at a time to the arithmetic units 1560 of the corresponding stage 1570.

The arithmetic units 1560 may be configured to repetitively conduct operations by using a data element from the streaming port (i.e., a row of tensor A) and a data element from the staging port (i.e., a column of tensor B). One of skill in the art will appreciate that the stages 1580 of the array of arithmetic units 1560 may act as data registers for the lanes 1580 while the tensor A data is streamed through the stages of the compute unit and the operations are conducted. When the K operations are complete, the computed values may be streamed to one or more assigned memory units via the output port 1590R. The process may be repeated until all rows (e.g., M/m) and columns (e.g., N/n) of the assigned sub-tensor have been computed by the compute unit 1550.

"Tensor Parallel Mapping and Data-Parallel Splits"

The Samballova Compiler facilitates a GPT-175B supporting compiler-infrastructure that consolidates data needed to train Al models. In this endeavor, Tensor-Parallel Mapping maps GPT3 175B on 8 RDUs, evenly splitting each node into 8 pieces on a dimension of the tensor and distributed to 8 RD Us. When necessary, these RD Us are synchronized. Tensor-dimension sharding as well as Tensor data-parallel split effectively map 175B GPT-3 input models to RDUs, with good performance.

The Samballova Compiler takes as input a Machine-Learning (ML) design in an ML framework, such as Py Torch, TensorFlow and after several layers of translation and analysis phases, produces low-level synthesized execution on Reconfigurable Data-Flow Units (RDU). Multiple RDUs are networked together with a general purpose CPU to form a Coarse Grained Reconfigurable Architecture (CGRA).

The Samba Nova Compiler comprises of several phases (FIG. 1). "Samba" comprises a set of wrappers around PyTorch classes that interface and integrate with Samballova's compiler software-stack. Model Analyzer (MAC) accepts Neural Network (NN) graphs in Pytorch, Jax or TensorFlow and is responsible for high level mapping decisions for a computation graph, given hardware constraints. AIR/TLIR/Code-generation (ARC) is a Neural-Network (NN) and ML-oriented stitching phase that translates MAC's high-level graph mapping decisions to explicit low-level graphs. RAIL provides a higher level interface than Assembly language. Assembler/Prism/PNR is phase comprising of Place and Route iterative passes that are integrated with an assembler to produce AI-processor-executable-format (PEF) files, a binary format accepted by the runtime execution engine.

The compiler stack and associated analysis and synthesis phases enable various services to run AI applications including Natural Language Processing (NLP) for production and deployment of language models. The ability to generate state-of-the-art, human-capable text, enables such applications to serve as powerful models for text-based AI. They rely on complex model tuning and training processes.

Compiler: A translator that processes statements written in a Programming Language to machine language instructions for a computer processor.

Compiler Phase: Each phase in a compiler creates an Intermediate Representation (IR) of the source program for processing by a subsequent phase. Predominantly there are Analysis and Synthesis Phases. An Analysis Phase performs analysis and transformations on the program whereas a Synthesis Phase creates an equivalent target-machine program from IR Computation Graph: ML algorithms are represented as computational graphs. They are a type of directed graphs that represent a mathematical expression. Nodes correspond to operations on variables and edges represent Tensor data flowing between operations. Tensor variables feed their value into operations; Operations feed their output to other operations. This graph is also termed Data Flow graph in ML as well as non-ML domains.

Data Flow graph: A collection of nodes and edges; nodes represent places where variables are assigned or used and edges reveal relationship between variable assignment and variable use. A data-flow graph automatically reveals data dependencies between operations. Thus, control and data aspects of a program are represented in a single integrated model. It serves as a graph model for computer programs, expressing possibilities for concurrent execution of program parts.

Traditionally, Recurrent Neural Networks (RNN) and their variants have been used extensively for NLP. Recently, Transformer models for language understanding have outperformed most RNN models. RNNs work with sequential data, such as, language translation and time-series data. They have been slow to train. Often training is truncated by back propagation in time. Moreover, they suffer from vanishing and exploding gradients and in NLP problems, information from the beginning of a sentence is lost. Long Term Short Term (LSTM) networks promised potential via a hidden state, the memory cell, which allowed information from a previous cell to flow to the current cell while skipping most of current-cell processing. This feature allowed the model to retain information for longer sequences. Unfortunately, LSTMs were even slower to train. Moreover, each word of a sequence is passed individually to the network. Processing is sequential, unable to take advantage of parallel-processing architectures.

Attention mechanisms address these limitations by using a global vector; the context vector contains the weighted sum of all hidden states. A Transformer architecture enables parallel processing; it uses attention and no RNNs. The input for the encoder is an entire sentence, not a word, each time. All words of a sentence are passed simultaneously to determine word embedding in the sequence as a vector representation such that words with similar meaning are closer. When the model contains no recurrence or convolution, it is necessary to inject information about the relative or absolute position of the tokens in the sequence.

The transformer model uses an explicit position encoding layer that retains the word's position in the sequence post embedding. After word and position embedding, it is processed by a Multi-head Attention (MHA) block. Typically, a single Encoder layer consists of MHA followed by a Feed Forward Neural Network (FFN). Linear layers are single layers of linear neurons, either static with input delays of 0 or dynamic with delays that are positive. During the forward pass, the linear layer computes the matrix product of the input and weight matrix.

The backward pass considers gradients. A Bias layer enables shifting the activation function by addition of a constant, usually considering layer convergence to the statistical mean of outputs. Bias in NNs are analogous to a constant in a linear function that transposes the line by that constant value. FFN comprises two Linear layers with Bias and ReLU activations after the first layer. Additional processing includes Dropout, Layer Normalization and residual connections. The latter skips connections to allow gradient flow through a network directly, several layers later.

Generative Pre-Training (GPT) uses a generative model, a statistical model of a joint-probability distribution $P(x, y)$ on an observable variable, x, and target variable, y. It is a neural network ML model trained using internet data to generate any type of text. Such a model of language facilitates acquisition of world knowledge to process long-range dependencies by pre-training on a diverse corpus with extended stretches of contiguous text. GPT-2, the successor of GPT, is an unsupervised transformer language model and its successor GPT-3 is an unsupervised transformer-language model. It requires a small amount of input text to generate copious volumes of relevant and sophisticated machine-generated text.

Attention mechanisms are an integral part of compelling sequence modeling and transduction models in various tasks, enabling modeling of dependencies without considering their distance in input or output sequences. An ML transformer is a deep-learning model that adopts the mechanism of self-attention that mimics cognitive attention, differentially weighting the significance of each part of the input data, trained by gradient descent; it relies entirely on an attention mechanism to draw global dependencies between input and output. This effect enhances some parts of the input data while diminishing other parts. These transformers are designed to handle sequential input data, such as natural language translation and text summary. They do not necessarily process the data in order; the attention mechanism provides context for any position in the input sequence.

GPT-3 is an autoregressive (AR) language model that uses deep learning to produce human-compatible text. Its deep learning NN is a model with over 175 billion ML parameters; the largest trained language model before GPT-3 was Microsoft's Turing NLG model, which had 10 billion parameters. AR is a representation of a random process, used to describe time-varying processes in statistics, econometrics and signal processing. The output variable depends linearly on its own previous values and on a stochastic term, imperfectly predictable. The model is a stochastic difference equation, or recurrence relation. Using text on the internet, GPT-3 is trained to generate realistic human text. Based on proliferation of stored data, it is capable of programming code from English prompts, layout generation, translating equations from English, create articles, poetry, stories, news reports and dialogue, as well as automating conversational tasks.

As parameters of NLP models grow larger, a single RDU's memory becomes incapacitated to store all parameters as well as intermediate activations. For example, a single socket RDU can only hold all parameters including the activation for a Batch Size (BS)=1.

BS=1 is unsuited for data flow architectures as most of their pipeline will be idle; only 1 sample flows through the pipeline. In addition, the weight load as well as optimizer overhead becomes unacceptable.

The GPT-3 model containing 175 billion ML parameters is huge. Its memory requirement does not fit a single RDU; it is scaled to 8 RD Us. Compiler phases perform following tasks automatically: (I) Tensor parallel mapping to distribute the model evenly on 8 RDUs by the Compiler's MAC phase; (Ia) GEMM partitioning dimensionally and even distribution on different RDUs by the Compiler's MAC phase; contrast with data-parallel shards on batch-size dimension that consume significantly more memory. For example, a Linear node with size [12288, 49152]*[49152, 2048] is divided into 8×[12288, 6144]*[6144, 2048], and distributed on 8 RDUs. Parallel processing yields 8 partial sums, one on each RDU; (Ib) MHA nodes, such as Scale, Softmax, Mui, Reshape are split in data-parallel by Compiler's ARC phase at AIR level. (II) "All Reduce" synchronization at Compiler's ARC phase at AIR level; This synchronization is essential to Add partial sums on each RDU and broadcast sum to all 8 RDUs.

Sharding is a specific form of partitioning an NN, represented as a computational graph, across multiple RDUs, each computing a portion of the graph; sharding implies that data is spread across multiple computers while partitioning does not. Although the model is evenly partitioned across RDUs, each subgraph is visible only to the assigned RDU; all subgraphs are encapsulated within the same session instance and trainable in a distributed paradigm. Sharding saves memory and enables training of models several times larger. Deep learning models improve with increased data and parameters, e.g., GPT-3 NN language-model using 175B parameters is the largest till date. It is trained on about 45 TB of text data from diverse data sets.

An attempt is made to divide an ML-node into 8 parts. GEMMs can be distributed onto 8 chips but LN is not amenable to such partitioning.

Consider the following examples: An attention function maps a query and a set of key-value pairs to an output, where the query, keys, values, and output are vectors. The output is computed as a weighted sum of these values, where the weight assigned to each value is computed by a compatibility function of the query with the corresponding key. Query, Key, Value(QKV) GEMM: [36 k, 12 k]*[12 k, 2048]=>RDUo . . . RDU7, each [4.5 k, 12 k]*[12 k, 2048]

Note that Query, Key, Value only interact with each other in Dot-Product Attention.

In this case, for the QKV GEMM, one sentence (Embedding size×Sentence Size) is mapped into Query, Key and Value. In the 175B case, weight for QKV GEMM=[36K, 12K]. [[0-12K], 12K] is for Query; [[12-24K], 12K] is for Key; [[24-36K], 12K] is for Value Multi-head Attention (MHA) runs through an attention mechanism several times in parallel. It uses h attention "heads" in parallel to attend to different learned projections of a sequence. This block focuses on self-attention, i.e., how each word in a sequence is related to other words within that sequence by capturing contextual relationships between words in a sentence. This self-attention is represented by an attention vector that is generated within the block. The relationship between two vectors is determined by computing scaled dot products that yields the similarity between two vectors. Two vectors are closely related if their dot product is 1, or −1 in case of negative correlation, and have no correlation if their dot product is 0. By using multiple attention vectors for each word and then taking a weighted average, the attention block becomes multi-headed. Each Attention Vector (AV) is independent of each other, consequently amenable to parallelization.

Figure 16:
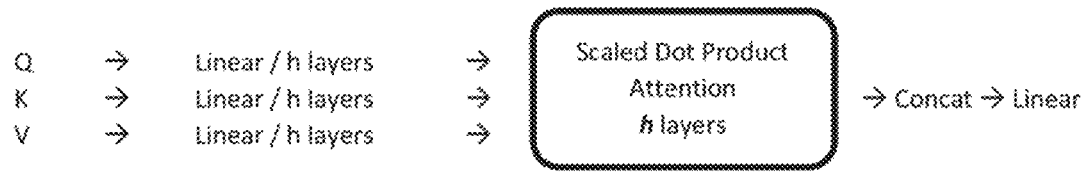
FIG. 16 shows scaled dot product addition.

$MHA(Q, K, V)=[head_1, \ldots, head_h]W_o$, where $head_i=Attention(QW_i^Q, KW_i^K, VW_i^V)$, W are all learnable parameter matrices. In this module, scaled dot-product addition is most commonly used, as depicted in FIG. 16.

Linear Function is a simple straight-line activation function directly proportional to the weighted sum of neurons or input.

Scaled Dot Product Attention is an attention mechanism where dot products are scaled down by $\sqrt{d_k}$.

Attention $(Q, K, V)$=softmax $(QK^T/\sqrt{d_k})V$, where q and k are $d_k$-dimensional vectors whose components are independent random variables with mean 0 and variance 1. Their dot product $q. k=\Sigma_{i=1}^{dk} u_i v_i$ has mean 0 and variance $d_k$. Division by $\sqrt{d_k}$ normalizes these values to have variance 1.

Matmul (Softmax (Scale (Matmul(Q,K))), V)
def Scaled_dot_product_attention(q, k, v):
matmul_qk=tf.matmul(q, k, transpose_b=true)
dk=tf.cast(tf.shape(k)[−1], tf.float32)
scaled_attention_logits=matmul_qk/tf.math.sqrt(dk)
attention_weights=tf.nn.softmax(scaled_attention_logits, axis=−1)
output=tfmatmul(attention_weights, v)
return output, attention_weights Normally, a Concatenation layer takes inputs and concatenates them along a specified dimension; it appends two Tensors where inputs have the same size in all dimensions except the concatenation dimension. For example, a layer with 256 channels, and another layer with 256 channels when concatenated channel-wise, yields and output with 512 channels. In general, a list of images of the same size is combined into a single multi-channel image. In Deep Learning, this operation increases the precision of learning.

However, in GPT-175B no Concatenation is performed after Scaled Dot Product Attention; instead, a simple k-split Linear is performed on each RDU and later All Reduce synchronizes.

175B GPT has 96 heads with each head sized 128, resulting in the product 96×128=12288=12K. After Data-Parallel Split (detailed in the following Section), the module Scaled dot_product_attention requires 12 heads on each RDU, after which, the resulting computation becomes 12 (heads)×128 (headsize)×2048 per RDU=1536×2048. A single RDU performs this computation that covers ⅛ of the original Tensor before split, i.e., total Tensor computation is 8×[1536, 2048]=[12 k, 2048].

MHA GEMM: [12 k, 12 k]*[12 k, 2048]=>RDU$_o$ . . . RDU7, each [12 k, 1.5 k]*[1.5 k, 2048]
RDU$_o$ ⇔ RDU$_1$⇔ RDU$_2$⇔ RDU$_3$⇔ RDU$_4$⇔ RDU$_5$⇔ RDU$_6$⇔ RDU$_7$ A Feed Forward Network (FFN) is applied to every AV so that the output can be consumed by the next encoder or decoder block. Each FFN typically consists of two dense layers with ReLU activations in between. The FFN is applied to each position separately and identically; it is different for each sub-layer. The FFN layer normalizes outputs and aids in learning during backpropagation via residual connections. While linear transformations are same across different positions, parameters differ between layers.

$$FFN(x)=\max(0, xW_1+b_1)W_2+b_2$$

FFN0 GEMM: [48 k, 12 k]*[12 k, 2048]=>RDUo . . .
RDU7, each [6 k, 12 k]*[12 k, 2048]; FFN1 GEMM:
[12 k, 48 k]*[48 k, 2048]=>RDUo . . . RDU7, each [12
k, 6 k]*[6 k, 2048]
RDU$_0$⇔ RDU$_1$⇔ RDU$_2$⇔ RDU$_3$⇔ RDU$_4$⇔
RDU$_5$⇔ RDU$_6$⇔ RDU$_7$ Usually, a simple node is interleaved between each Linear Layer. For example, a Gaussian Error Linear Unit (GELU) is placed between FFN0 and FFN1 GEMM. The GELU activation function is xφ(x), where φ(x) is the standard Gaussian cumulative distribution function. GELU nonlinearity weights inputs by their percentile, rather than gating by their sign as in ReLUs (x=1$_{x>o}$). Consequently, GELU can be considered a smoother ReLU.

As a sharded Tensor is distributed across 8 RDUs, considering a Tensor [48K, 2048], each RDU processes [6144, 2048] tensor during GELU computation. Between FFN1 GEMM and QKV GEMM in the next Encoder, a dropout, ADD and LayerNormalization occurs. After FFN1 GEMM, the tensor is duplicated on 8 RDUs, in turn duplicating dropout and LayerNormalization operations on each RDU, to result the same input as well as output. However, such duplication on-chip does not incur a large cost.

Finally, a Linear layer, which is another FFN, followed by dropout and skip-connection ADD that sends data to the next encoder. In the end, a Cross Entropy node yields the probability distribution of all next words and the next predicted word with the highest probability score. This process is executed multiple times until the end of the sentence is generated for the sequence.

Figure 17:
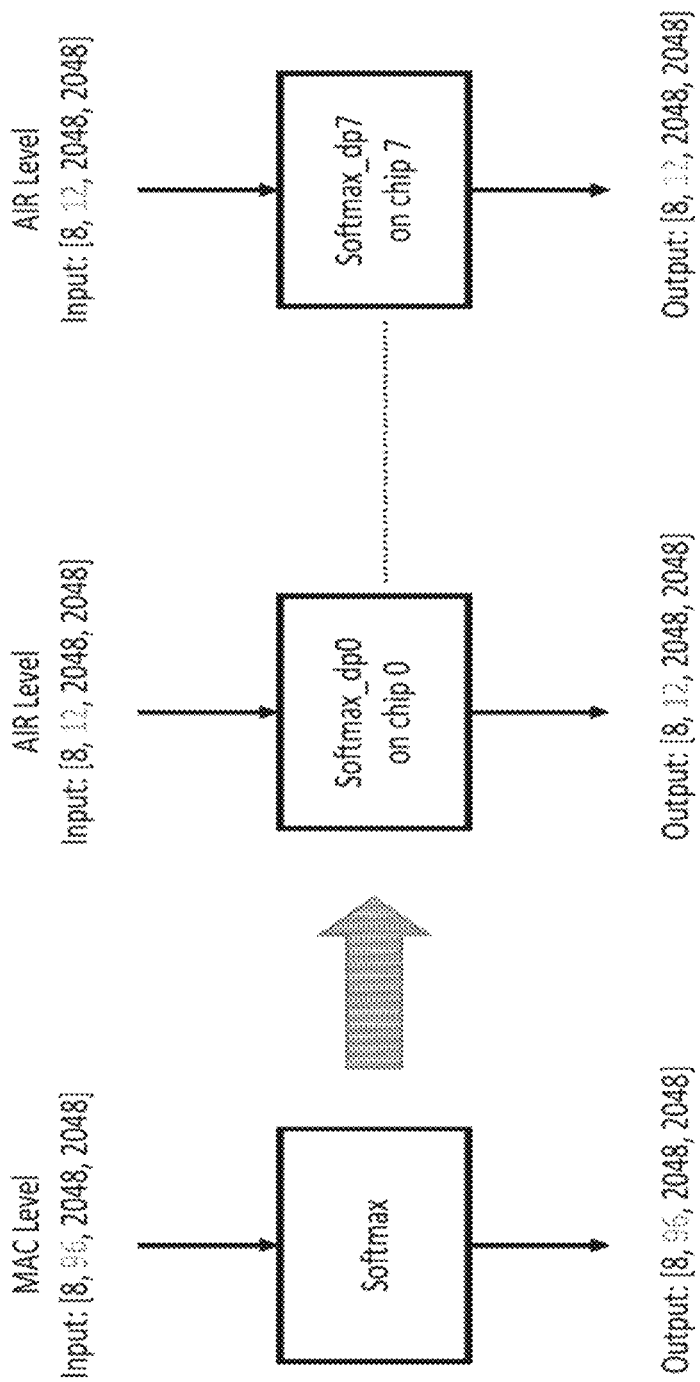
FIG. 17 shows ARC phase performs splitting at the AIR level (see #3)

The compiler's MAC phase provides a GEMM sharding feature that divides a big GEMM into smaller GEMMs distributable across different RDUs. However, for operation nodes such as Scale, Softmax, Mui and Reshape, the ARC phase performs splitting at the AIR level FIG. 17.

Currently Node split in MAC/AIR is supported for GEMM and Math nodes. When split in AIR, MAC passes down the split annotation. When Node-split is performed in MAC, the node is partitioned it into 8 separate nodes. Differences between these two approaches mainly stem from DRAM allocation. A SoftMax node is split in AIR to yield [8, 96, 2048, 2048] regions in DRAM. On the contrary, a MAC NodeÅ-split yields 8× of [8, 12, 2048, 2048] regions in DRAM. Both cases are advantageous in differing situations.

A data-parallel split partitions a batch across multiple RDUs. The model is copied to each RDU and calculations are synchronized across all RDUs.

Consider an example of Softmax at MAC level that is data-parallel split at ARC-AIR level: MAC: [8, 96, 2048, 2048]→Softmax→[8, 96, 2048, 2048];

After Data-Parallel Split, ARC-AIR: [8, 96, 2048, 2048]
→Softmax dpo on RDUo→[8, 12, 2048, 2048]
→Softmax dp1 on RDU$_1$→[8, 12, 2048, 2048]
→Softmax dp2 on RDU$_2$→[8, 12, 2048, 2048]
→Softmax dp3 on RDU$_3$→[8, 12, 2048, 2048]
→Softmax dp4 on RDU$_4$→[8, 12, 2048, 2048]
→Softmax dps on RDU$_5$→[8, 12, 2048, 2048]
→Softmax dp5 on RDU$_6$→[8, 12, 2048, 2048]
→Softmax dp7 on RDU$_7$→[8, 12, 2048, 2048]

Several advantages of such a distributed Tensor mapping are evident: 1. Workloads are distributed evenly on each chip facilitating their run-duration to be close. If All-reduce synchronization becomes necessary between RDUs, waiting times will be small. 2. Each chip can hold ⅛ of all parameters and ⅛ of most activations; some activations are duplicated. Memory capacity will be evenly split and DRAM cap-utilization will be high. 3. This mapping accommodates varying number of chips in the system as well as changes in Model parameters. Currently, a python script automatically generates a map file based on system and model configuration.

Figure 18:
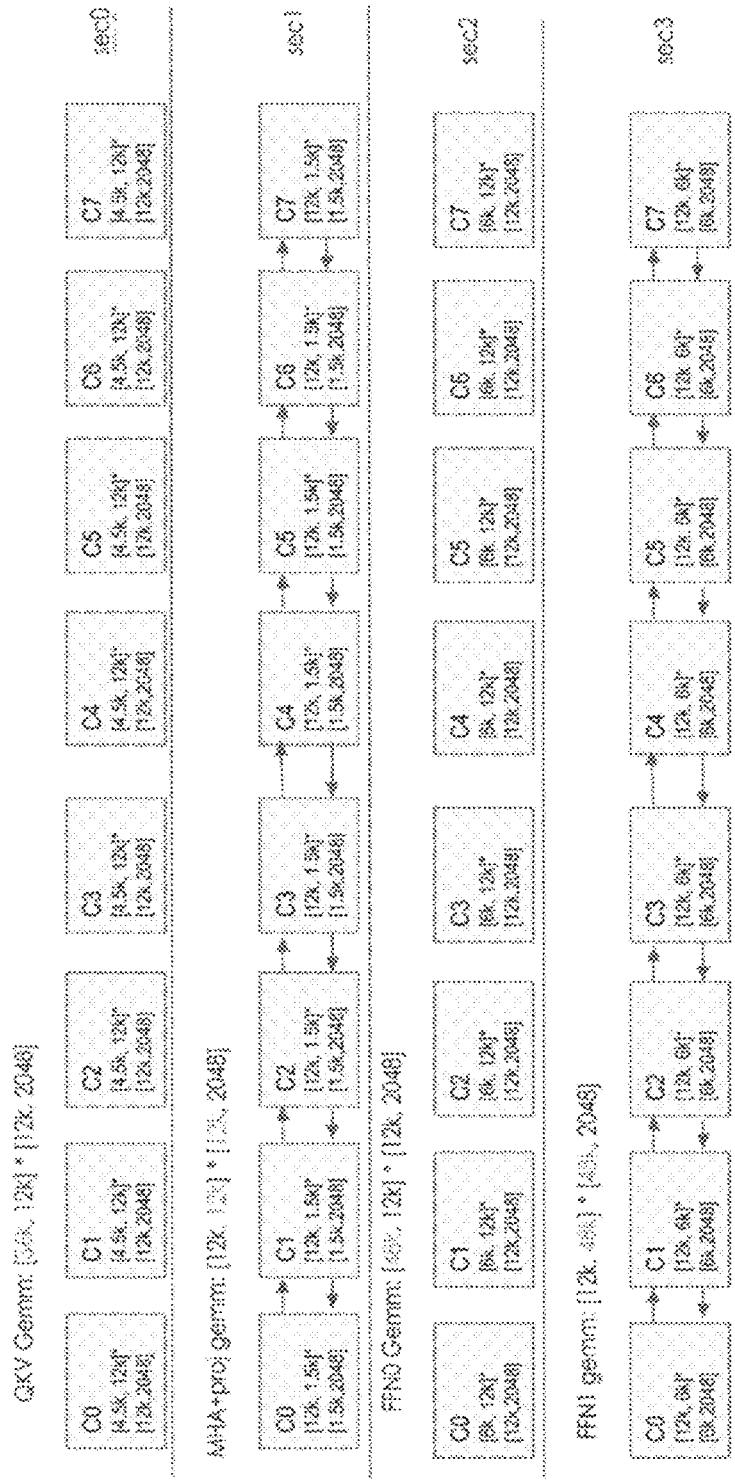
FIG. 18 depicts an example of an Encoder. (see #2)

FIG. 18 depicts an example of an Encoder having these advantages. In that figure, Section2 considers an FFN0 Gemm with a split on 48K dimension. Each chip is computing [6144, 12K]*[12K, 2048]. Performing an M-split here obviates the need for All Reduce in this section; the result is directly written into local DOR. At Section2, we are doing FFN0 gemm, and we do split on 48K dim, Each chip is doing [6144, 12K]*[12K, 2048]. Since we are doing M-split here, no need for All reduce to Happen in this section, the result will be directly written into local DOR.

The next Section is FFN1 forward propagation (FWD), with a split on K-dim. The Next Section will be FFN1 fwd, We are doing split on K-dim, Each chip we are doing [12K, 6144]*[6144, 2048]. And Results we need to do All Reduce through here, we do this through PCIE. Each chip computes [12K, 6144]*[6144, 2048]. In this case, an All Reduce is necessary to obtain results and is performed through PCIE.

Between FFN1 GEMM and QKV GEMM of the next Encoder, other operations such as Dropout, LayerNorm are necessary. These operations are duplicated on 8 chips as the resource cost is small. The QKV GEMM Section needs the duplicated input on the M-split GEMM. With This Mapping, 1-Encoder of GPT3 175B could be mapped into 12 sections, 4 sections for fwd, 4 sections for bwd, and 4 sections for weight gradient calculation. And here only 4 Sections will have P2P connection(2 in fwd and 2 in bwd), In the section with P2P, we are trying to balance the computation and P2P link, make sure P2P wont be the bottleneck for those sections.

Tensor/Node duplication in Tensor Parallelism Mapping requires some elaboration. In GPT, between attention projection GEMM and FFN0 GEMM, operations dropout, skip connection add and Layernorm appear.

As previously described, k-break occurs on attention projection GEMM, full size=[12288, 12288]*[12288, 2048], and each chip computes [12288, 1536]*[1536, 2048]). For FFN0 GEMM, full size is [49152, 12288]*[12288, 2048], and m-break is performed for this GEMM. Each RDU computes [6144, 12288]*[12288, 2048], implying the same input on each chip.

A naive implementation considers All_reduce after attention projection GEMM, ensuring each RDU has duplicated tensor [12288, 2048], followed by duplicated dropout, skip-connection add and LayerNorm between them. Since these operations are small compared to GEMM, resource overhead will be negligible.

DOR BW is a concern. When a section is cut between skip connection add and LayerNorm, each RDU must store the same Tensor [12288, 2048] to DRAM, thereby wasting precious DOR capacity and bandwidth. Some sections reveal DOR-bound performance.

The solution is to trade off P2P for DOR bandwidth and capacity. For example, after skip connection add, chip 0, 2, 4, 6 can store the upper half of the Tensor [12288, 2048], and chips 1, 3, 5, 7 can store the lower half of the Tensor [12288, 2048]. At the start of next section, data exchanges between 0↔1, 2↔3, 4↔5, 6↔7 suffice. Thereafter, the full Tensor is input to LayerNorm.

The above example illustrates the tradeoff between PCIE Bandwidth for DOR. For additional DOR BW and capacity, each RDU need only store ⅛ of the Tensor, and at the beginning of the next section, an all-to-all broadcast is performed. While it can save more DOR BW, it consumes additional PCIE Bandwidth.

The Compiler has DOR and PCIE Bandwidth information for each section; therefore, it can decide which topology to employ.

With this mapping, 1 Encoder of GPT3 175B can be mapped to 12 sections, 4 sections for FWD, 4 sections for backward propagation (BWD) and 4 sections for weight-gradient calculation. In this case, only 4 Sections have P2P connection, 2 each in FWD and BWD. In sections with P2P, there is an attempt to balance computation with P2P link time to ensure that the latter is not a bottleneck for those sections.

It remains a challenge for productizing GPT as a platform that democratizes the creation of AI-powered applications. Research continues to move the needle on NLP by creating even larger NNs and feeding them more data than before. The Samba Nova Compiler facilitates an infrastructure that consolidates data needed to train AI models.

In this endeavor, Tensor-parallel mapping is presented that effectively maps GPT-3 input models to RDUs, with good performance. Without such compiler technology, a 175 billion parameter languageÂ-model's memory requirement cannot fit a single RDU processor. Moreover, with this compiler mapping, a model's graph nodes that are conventional performance bottlenecks are now executed faster. For example, some sections in the model have Peer-to-Peer (P2P) communication, such as SMS conversational text messaging between two parties. Conventionally, P2P is the largest consumer of network bandwidth. However, with performance tuning and optimized ring topology, P2P sections no longer remain bottlenecks.

Tensor-dimension sharding as well as Tensor data-parallel split effectively map 175B GPT-3 input models to RDUs, with good performance.

Issue: When the parameters of NLP models grow bigger and bigger, a single RDU's memory won't be able to fit to store the Params as well as intermediate activations. E.g, single socket RDU can only hold all the params+the activation for BS=1.

BS=1 will be super bad for data flow architecture which means most of the pipeline will be idle. (only 1 sample flow through the pipeline) And the weight loading/Optimizer overhead will also be bad.

Solution: We came up with Tensor-Parallelism Mapping to map GPT3 175B on 8 RDUs. The idea will be: Evenly split each node into 8 pieces on a certain dim of the tensor, and distributed on 8 Chips. Only Do Sync up when necessary.

By doing this, we have the following advantage: 1. Workloads are breaking even on each chip, so the run duration will be close. If we need to do All-reduce sync up between RDUs, waiting time will not be long 2. Each chip will hold ⅛ of all Param and ⅛ of most of activation. (some activations are duplicated.) From Memory Capacity side, it will be evenly split, So the DRAM cap utilization will be high. 3. It will be flexible for mapping, if the number of chips in the system changes, or some Model param changes, we can easily adjust. (Currently we have a python script to automatically generate mapping file based on system/model configuration)

The examples disclosed herein include a system for reducing latency and increasing throughput in reconfigurable dataflow processors, the system comprising:
   a host computer comprising a graph optimization module configured to conduct a method comprising:
      receiving a compute graph for execution on a reconfigurable dataflow computing system, the compute graph comprising a node specifying an operation on a tensor
      splitting the node into multiple nodes that each specify the operation on a distinctive portion of the tensor to produce a first modified compute graph; and
   a reconfigurable dataflow processor (RDP) configured to execute the first modified compute graph
Optional features for the above system include:
wherein splitting the node into X nodes improves latency by a factor of X
wherein the multiple nodes that each specify the operation on the distinctive portion of the tensor are within a single meta-pipeline stage
   wherein the multiple nodes that each specify the operation on distinctive portions of the tensor are processed in parallel
further comprising adding a separate node for gathering the distinctive portions of the tensor into a complete tensor, to produce a second modified compute graph
   wherein the separate node specifies a concatenation operation, a summation operation, or a tensor assembly operation
   wherein the multiple nodes and the separate node are within the single meta-pipeline stage
wherein the reconfigurable dataflow computing system comprises a grid of compute units and a grid of memory units interconnected with a switching array, each compute unit comprising an array of arithmetic units organized into I lanes and J meta-pipeline stages
   wherein the tensor comprises M rows
      providing each of the M rows to a different lane of the I lanes
         wherein the M rows are provided by or received by at least one memory unit
            wherein the tensor flows through at least one compute unit of the grid of compute units
            wherein the tensor flow is controlled by the at least one memory unit
   wherein the tensor comprises N columns
      sequentially providing each of the N columns to a stage of the J stages
         wherein the N columns are provided by or received by at least one memory unit
            wherein the tensor flows through at least one compute unit of the grid of compute units
            wherein the tensor flow is controlled by the at least one memory unit The embodiments disclosed herein include a method for reducing latency and increasing throughput in a reconfigurable computing system, the method comprising:
   receiving a compute graph for execution on a reconfigurable dataflow processor (RDP), the compute graph comprising a node specifying an operation on a tensor
   splitting the node into multiple nodes that each specify the operation on a distinctive portion of the tensor to produce a first modified compute graph
   executing the first modified compute graph on the RDP
Optional features for the above method include:
wherein splitting the node into X nodes improves latency by a factor of X
wherein the multiple nodes that each specify the operation on the distinctive portion of the tensor are within a single meta-pipeline stage wherein the multiple nodes that each specify the operation on distinctive portions of the tensor are processed in parallel
further comprising adding a separate node for gathering the distinctive portions of the tensor into a complete tensor, to produce a second modified compute graph
wherein the separate node specifies a concatenation operation, a summation operation, or a tensor assembly operation
wherein the multiple nodes and the separate node are within the single meta-pipeline stage
wherein the reconfigurable dataflow computing system comprises a grid of compute units and a grid of memory units interconnected with a switching array, each compute unit comprising an array of arithmetic units organized into I lanes and J meta-pipeline stages
wherein the tensor comprises M rows
providing each of the M rows to a different lane of the I lanes
wherein the M rows are provided by or received by at least one memory unit
wherein the tensor flows through at least one compute unit of the grid of compute units
wherein the tensor flow is controlled by the at least one memory unit
wherein the tensor comprises N columns
sequentially providing each of the N columns to a stage of the J stages
wherein the N columns are provided by or received by at least one memory unit
wherein the tensor flows through at least one compute unit of the grid of compute units
wherein the tensor flow is controlled by the at least one memory unit As will be appreciated by those of ordinary skill in the art, aspects of the various embodiments described herein may be embodied as a system, device, method, process, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "circuit," "circuitry," "module," "computer," "logic," "FPGA," "unit," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage mediums may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method or process. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e., embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

What is claimed is:

1. A system for reducing latency and increasing throughput in reconfigurable dataflow processors, the system comprising:
 a host computer comprising a graph optimization module configured to conduct a method comprising:
  receiving a compute graph for execution on a reconfigurable dataflow computing system, the compute graph comprising a node specifying an operation on a tensor;
  splitting the node into multiple nodes that each specify the operation on a distinctive portion of the tensor to produce a first modified compute graph; and
 a reconfigurable dataflow processor (RDP) configured to execute the first modified compute graph.

2. The system of claim 1, wherein splitting the node into X nodes improves latency by a factor of X.

3. The system of claim 1, wherein the multiple nodes that each specify the operation on the distinctive portion of the tensor are within a single meta-pipeline stage.

4. The system of claim 3, wherein the multiple nodes that each specify the operation on distinctive portions of the tensor are processed in parallel.

5. The system of claim 3, further comprising adding a separate node for gathering the distinctive portions of the tensor into a complete tensor, to produce a second modified compute graph.

6. The system of claim 5, wherein the separate node specifies a concatenation operation, a summation operation, or a tensor assembly operation.

7. The system of claim 5, wherein the multiple nodes and the separate node are within the single meta-pipeline stage.

8. The system of claim 1, wherein the RDP comprises a grid of compute units and a grid of memory units interconnected with a switching array, each compute unit comprising an array of arithmetic units organized into I lanes and J meta-pipeline stages.

9. A method for reducing latency and increasing throughput in a reconfigurable computing system, the method comprising:
 receiving a compute graph for execution on a reconfigurable dataflow processor (RDP), the compute graph comprising a node specifying an operation on a tensor;
 splitting the node into multiple nodes that each specify the operation on a distinctive portion of the tensor to produce a first modified compute graph; and
 executing the first modified compute graph on the RDP.

10. The method of claim 9, wherein splitting the node into X nodes improves latency by a factor of X.

11. The method of claim 9, wherein the multiple nodes that each specify the operation on the distinctive portion of the tensor are within a single meta-pipeline stage.

12. The method of claim 11, wherein the multiple nodes that each specify the operation on distinctive portions of the tensor are processed in parallel.

13. The method of claim 11, further comprising adding a separate node for gathering the distinctive portions of the tensor into a complete tensor, to produce a second modified compute graph.

14. The method of claim 13, wherein the separate node specifies a concatenation operation, a summation operation, or a tensor assembly operation.

15. The method of claim 13, wherein the multiple nodes and the separate node are within the single meta-pipeline stage.

16. The method of claim 9, wherein the RDP comprises a grid of compute units and a grid of memory units interconnected with a switching array, each compute unit comprising an array of arithmetic units organized into I lanes and J meta-pipeline stages.

17. A computer program product comprising a non-transitory computer readable storage medium having program instructions embodied therewith, wherein the computer readable storage medium is not a transitory signal per se, wherein the program instructions are executable by a processor to cause the processor to conduct a method comprising:
 receiving a compute graph for execution on a reconfigurable dataflow processor (RDP), the compute graph comprising a node specifying an operation on a tensor;
 splitting the node into multiple nodes that each specify the operation on a distinctive portion of the tensor to produce a first modified compute graph; and
 executing the first modified compute graph on the RDP.

* * * * *